(12) United States Patent
Sarraute Yamada et al.

(10) Patent No.: US 8,490,193 B2
(45) Date of Patent: Jul. 16, 2013

(54) SYSTEM AND METHOD FOR PROBABILISTIC ATTACK PLANNING

(75) Inventors: Carlos Emilio Sarraute Yamada, Buenos Aires (AR); Ariel Futoransky, Buenos Aires (AR); Gerardo Gabriel Richarte, Buenos Aires (AR); Jorge Lucangeli Obes, Buenos Aires (AR)

(73) Assignee: Core Security Technologies, Boston, MA (US)

( * ) Notice: Subject to any disclaimer, the term of this patent is extended or adjusted under 35 U.S.C. 154(b) by 187 days.

(21) Appl. No.: 12/877,815

(22) Filed: Sep. 8, 2010

(65) Prior Publication Data

US 2011/0061104 A1 Mar. 10, 2011

Related U.S. Application Data

(60) Provisional application No. 61/240,650, filed on Sep. 8, 2009.

(51) Int. Cl.
*G06F 21/00* (2006.01)

(52) U.S. Cl.
USPC .............................. 726/23; 713/188; 709/206

(58) Field of Classification Search
None
See application file for complete search history.

(56) References Cited

U.S. PATENT DOCUMENTS

| 6,574,737 B1* | 6/2003 | Kingsford et al. .............. 726/25 |
| 2009/0007270 A1* | 1/2009 | Futoransky et al. ............. 726/25 |
| 2009/0307772 A1* | 12/2009 | Markham et al. ............... 726/22 |

FOREIGN PATENT DOCUMENTS

| WO | 00/38036 A2 | 6/2000 |
| WO | 2008/142710 A2 | 11/2008 |

OTHER PUBLICATIONS

Xinzhou Qin et al, A probabilistic-Based Framework for INFOSEC alert correlation,College of Computing George Institute of Technology.*

* cited by examiner

*Primary Examiner* — Fikremariam A Yalew
(74) *Attorney, Agent, or Firm* — Peter A. Nieves; Sheehan Phinney Bass + Green PA

(57) ABSTRACT

A system and method for automated probabilistic planning of network attacks against infrastructures of computer networks and applications is provided. The embodiments automate the analysis and probabilistic planning of multi-step attacks to computer and application networks (in particular in the context of automating penetration tests), optimizing with respect to one of the following metrics: the probability of success of the actions, a numerical parameter that must be minimized (e.g., running time), or the number of logs generated by the control devices in the target network.

10 Claims, 26 Drawing Sheets

SYSTEM AND METHOD FOR PROBABILISTIC ATTACK PLANNING

CROSS-REFERENCE TO RELATED APPLICATION

This application claims priority to copending U.S. Provisional Application entitled, "Fast Algorithm for Probabilistic Attack Planning," having Ser. No. 61/240,650, filed Sep. 8, 2009, which is entirely incorporated herein by reference.

FIELD OF THE INVENTION

The present invention is generally related to computer and network security, and more particularly to development of a probabilistic attack planner that can automatically plan and build attack plans, taking into account probabilistic information about the actions that can be performed. The plans generated can be run in a penetration testing framework.

BACKGROUND OF THE INVENTION

A penetration test is a set of risk assessment methodologies where the "penetration testers" or auditors assume the standpoint of an attacker in order to examine security controls in place of an infrastructure of networked computers and applications. Typically, the penetration tester will mimic a specific profile of an attacker, which can be a disgruntled employee in a given area of an organization, an external "script kiddie" or a corporate spy. The result of the penetration test is generally a report that includes the list of threats that this profile of an attacker could exercise. For example, a disgruntled employee in accounting may be able to steal the clients and credit card database, a corporate spy may be able to access secret Intellectual Property, and a "script kiddie" may compromise and leave unavailable the machines for all the cashiers of a retailer business.

The last ten (10) years have witnessed the development of a new kind of information security tool: the Penetration Testing Framework. An exemplary description of a Penetration Testing Framework is provided by U.S. Pat. No. 7,757,293, entitled, "Automated Computer System Security Compromise," by Caceres et al., filed on Jan. 22, 2002, which is incorporated by preference in its entirety. Penetration Testing Frameworks facilitate the work of penetration testers on networked computers and applications, and make the security assessment more accessible to non-experts. The main difference between these tools and network security scanners is that Penetration Testing Frameworks have the ability to exploit vulnerabilities, and help to expose risk by assessing the complete attack path an attacker would take, whereas scanners simply look for evidence of vulnerabilities.

Penetration tests involve successive steps of information gathering and vulnerability exploitation. In an information-gathering step the penetration-testing framework helps the user to gather information about the networked computers and applications under attack (available hosts, their operating systems, open ports, and the services running in them). In a vulnerability-exploitation step the user actively tries to leverage vulnerabilities present on specific assets in the network and gain unwarranted access to these assets. When this leverage is through an exploit executed against a vulnerable host (e.g., a desktop, laptop or server computer system) and this exploit is successful, the host becomes compromised and can be used to perform further information gathering, or the machine can be used to execute subsequent attack steps. This shift in the source of the actions of an attacker is called pivoting. Newly compromised machines or applications can serve as the source for posterior information gathering. This new information might reveal previously unknown vulnerabilities. As a result, the phases of information gathering and exploiting usually succeed one another.

Other forms of leveraging vulnerabilities are, for example but not limited to, exploitation of application vulnerabilities and gaining non-authorized access to Wi-Fi communication channels or other types of assets.

As attackers have evolved, so have penetration-testing frameworks: they have become more complex, covering new attack vectors, shipping increasing numbers of exploits (hereafter exploit modules) and information gathering modules. With this evolution, the problem of successfully mimicking an attacker has become a complex task.

The penetration tester is a skilled technician who can develop exploit modules, understands the consequences of using one exploit module over another one in a particular situation, or how to replace the exploit module in case it does not work, and can craft an attack towards a given objective in accordance with constraints underlying the scenario at hand. Understanding the consequences of executing each attack action is fundamental for an effective penetration test. While different actions may have the same outcome (when successful), they will typically last differently, have different probabilities of success, take different requirements, and have other effects.

During the exercise of a penetration test, the penetration tester will execute penetration-testing modules (information-gathering or exploit modules), and by executing the modules he may obtain new assets. An example is the penetration tester running an exploit module from his local agent against a remote target host, and when the exploit module succeeds the module installs a remote agent in the remote target host. This remote agent is an asset that is added to assets of the penetration tester. During his work, the penetration tester will attempt to achieve certain objectives. One example of such an objective may be installing a remote agent in a web server, or obtaining a credit card database. These special objectives are referred to as the goal of the penetration test. Typically, the penetration tester will plan a penetration test looking to obtain certain specific goals.

Hence, if a penetration tester has some partial knowledge of a network he is auditing, he can define the potential actions that he may follow and from those derive the new states in which the network would be, and move on to define new actions and new states until he reaches a state that is worth reporting; in particular, if one of the goals is reached. However, the number of possibilities that are available to the penetration tester, and hence the number of nodes and edges that constitute an attack graph, may be large. Explicitly the number of nodes and edges that constitute an attack graph may be comparable to the number of computers in the network to the power of the number of available attack modules, so that it may turn to be an infeasible problem to visualize them, or pick one of these attacks out from the lot that has a special property, such as, for example, being the quickest.

In computer science a problem is said to be infeasible when despite the algorithm used to solve it, the amount of resources needed (computational power or storage) is extremely large and the combinations to be tested quickly increases with the size of the problem.

Computer attacks, including those executed with aid of a penetration-testing framework, are the object of study of computer scientists and computer security professionals. In particular, the threats or potential attacks underlying a target network can be described through attack graphs. In particular, attack graphs can be used to model an attack before executing the attack, or during execution of an attack in order to analyze next steps.

There are many ways to model an attack through attack graphs. To define one such model, one needs to define "nodes" and "edges." In one possible way to model attack graphs, nodes identify a state of the attack, while edges represent individual actions that the attacker may follow during the attack. Generally speaking, the state is defined by the knowledge that the attacker has gained about the network, and the changes he has inserted in the network, from the start of the attack until the action (edge) preceding this node. The new assets obtained by the attacker are different depending on whether the assets were obtained after an action is run or before an action is run. In attack graphs, an attack path is a path in the graph from a start node to the goal node; that is, a sequence of actions, where the preconditions for an action are always guaranteed by the previous actions and the last action conquers the goal.

However, selecting one such attack path is not an easy task. Many attack paths may be possible, each one underlying different combinations of attacks and parameters. For example, one of the attacks suggested by the attack path may turn out to be faster, another one may have better chances of succeeding, and another one may cause alerts in the control or security monitoring systems of the target network. In fact, penetration-testing frameworks do not include the information summarizing how much time each of its penetration-testing modules takes to run, their probability of success, and other factors. Moreover, even if this information were available, the problem of piecing the information together to weigh attack paths and deciding whether one is better-suited than another one in a particular case, seems to be outside of reach of the standard penetration tester.

Previous attack graph models do not include a concise way of summarizing the different alternatives the attacker may choose from to conduct an attack and the parameters (expected time, probability of success, etc.) underlying these attack paths, thus allowing an explosion of combinations, deterministically intractable for medium-sized networks and larger networks. In particular, previous attach graph models do not tackle the problem of picking an attack path that minimizes the expected time to be run, or which is expected to raise a lower number of alerts (logs) in the control systems, or has a bigger probability of success.

Another drawback of previous attack planning systems is that they are deterministic, in the sense that they output the best solution (or in any case, the best few solutions). Being that penetration tests are intrinsically probabilistic (e.g., one cannot predict the outcome of each penetration testing module with absolute certainty), deterministic attack plans are not suited for assisting the penetration tester. As an example, if a step in the deterministic attack plan fails, while the plan is being executed, the penetration tester must drop this attack plan and replace it with another one.

Thus, a heretofore unaddressed need exists in the industry to address the aforementioned deficiencies and inadequacies.

SUMMARY OF THE INVENTION

Embodiments of the present invention provide a system and method for automated probabilistic planning of network attacks against infrastructures of computer networks and applications. The embodiments automate the analysis and probabilistic planning of multi-step attacks to computer and application networks (in particular in the context of automating penetration tests), optimizing with respect to one of the following metrics: the probability of success of the actions, a numerical parameter that must be minimized (e.g., running time), or the number of logs generated by the control devices in the target network.

A method for designing a penetration test for a penetration testing framework is provided, which contains the steps of defining a variable to be optimized; defining a scenario, wherein the scenario further comprises, a definition of a target network, a list of penetration testing modules that are available, wherein each penetration testing modules has associated with it a probability of success, requirements, and an expected value for the variable to be optimized, and a goal of the penetration test; and producing a probabilistic plan, an estimated probability of success for the probabilistic plan, and an expected value for the variable.

In addition, a method for designing a probabilistic plan for attacking from a first host a second host, for a penetration testing framework, is also provided, containing the steps of: defining a variable to be optimized; defining a scenario, wherein the scenario further comprises, a description of the first host located within a target network, the second host located within the target network, and how the first host and second host are connected, a list of penetration testing modules that are available, wherein each penetration testing module has associated with it a probability of success, requirements, and an expected value for the variable to be optimized; and producing a probabilistic plan that has as a goal to install an agent in the second host, an estimated probability of success for the probabilistic plan, and an expected value for the variable.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
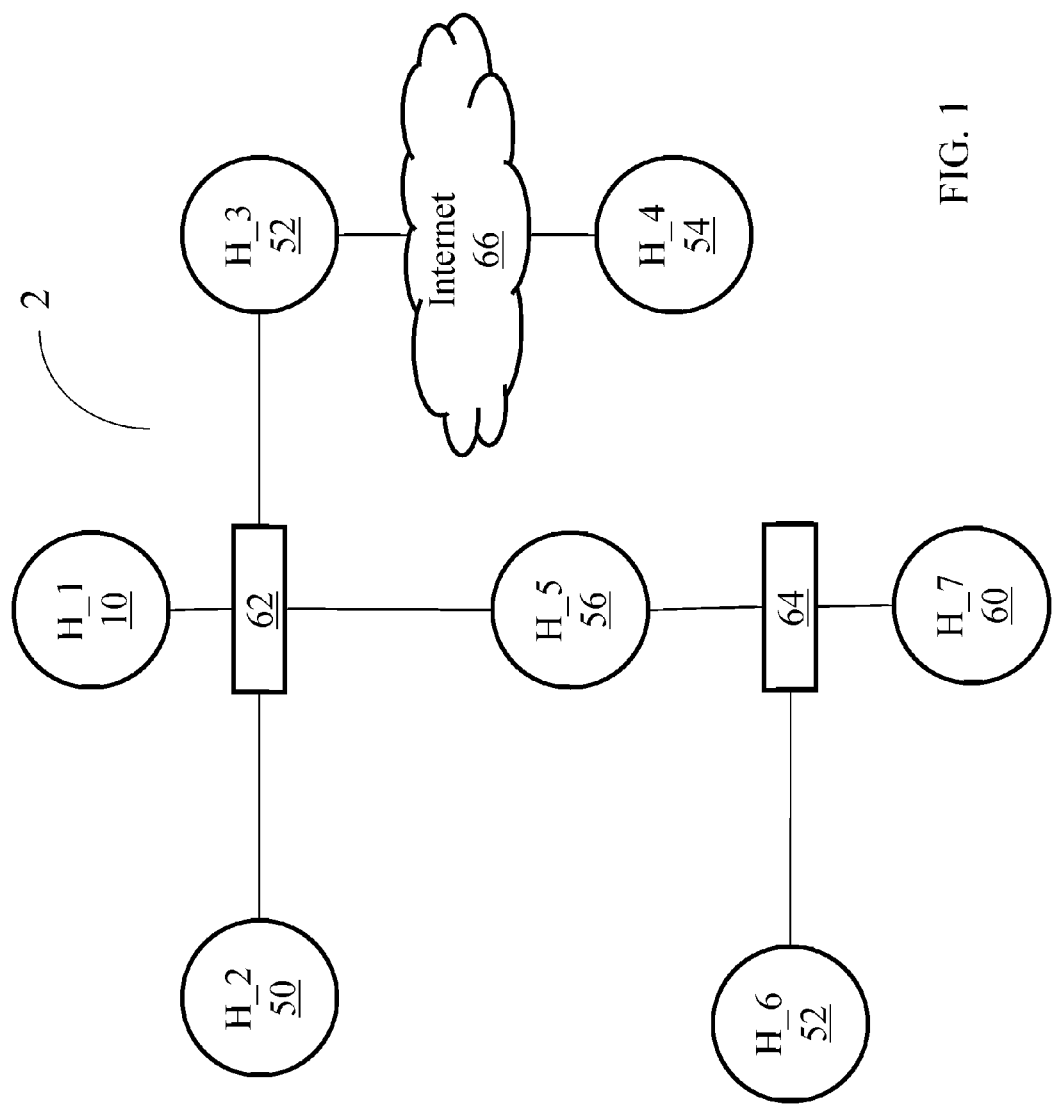
FIG. 1 is a schematic diagram illustrating a network of computer systems and applications in which the present invention may be provided.

The present system and method performs automated probabilistic planning of network attacks. A computer-generated plan is provided for an automated penetration test, which isolates the penetration tester from the complexity of selecting the suitable actions that can be executed in a target network. Further, incorporating an attack planning phase to the penetration testing framework allows, in accordance with the present invention, optimizations based on, but not limited to, coverage of the tested threats, attack running time, probability of success, and/or minimizing the expected number of alerts that are generated by other control systems or defense systems, such as, but not limited to, intrusion detection systems. As is known by those having ordinary skill in the art, intrusion detection systems are devices or applications that inspect network traffic, looking for attacks and generating alerts when attacks are detected. Detection is performed by inspecting packet streams looking for "static signatures of attacks," or statistical deviations from good behavior, or variations of previously-identified malicious behavior.

The present system and method uses a conceptual model of an attack distinguishing assets, agents and actions. In the present description, an attack involves a set of agents, executing sequences of actions, obtaining assets (which can be information or actual modifications of the real network and systems) in order to reach a set of goals. The assets represent both the information and the modifications in the network that an attacker may need to obtain during an attack, whereas the actions are the basic steps of an attack, such as running a particular exploit or information gathering module against a target asset.

An asset can represent anything that an attacker may need to obtain during the course of an attack, including the actual goal. Some examples of assets include, but are not limited to, a string identifying the operating system (OS) of a host H; transmission control protocol (TCP) connectivity with a host H on a port P; and an agent installed on a given host H. To install an agent means to break into a host, take control of its resources, and eventually use it as a starting point to continue the attack by launching new actions based on that host. A further description of agents is provided by U.S. Pat. No. 7,757,293, entitled, "Automated Computer System Security Compromise," by Caceres et al., filed on Jan. 22, 2002, the disclosure of which has been previously incorporated by reference in its entirety.

An action can be, but is not limited to, running one penetration testing module from any agent. An action may have requirements or preconditions that need to be satisfied in order for the action to be run. These requirements are defined as a set of assets. For example, in order to run an OS detection module against a host from a given agent, one needs network connectivity to this host. Network connectivity to the host is the asset required in order for the action to be run. The penetration testing module will then output an estimate for the OS of this host. After executing an action, a new asset may be gained, that is, new information is learned or a change in the target network has happened.

In a given network, and as described above, there may be a special asset that is one of the targets of a penetration test. This asset is referred to as the goal of the test. Since the actions have requirements and results, in accordance with the present invention, for each goal, one can construct an attack graph describing the actions/assets that start from the available assets and lead to this goal. As is explained in further detail herein, the attack planning problem entails automatically finding sequences of actions that lead from a starting state of the attack, with incomplete knowledge of the network, ending in the final goal.

To improve the realism of the model, in accordance with the present invention, it is considered that actions can produce numerical effects and have a probability of success. A numerical effect is a metric that allows modeling the expected result of executing such an action in the network using the penetration testing framework. For example, a numerical effect may be (but is not limited to) the expected running time of the action. Both the numerical effects and the probability of success of an action can be estimated in a laboratory through experimentation. For example, by running a given exploit module against different target computers in a laboratory one can estimate the probability of success of this exploit as the mean of successful exploitations in the laboratory. Similarly, one can estimate the time the exploit module takes until it is successful. The latter can also be calculated based on historical runs performed inside the Penetration Testing Framework.

As is explained in further detail herein, according to the present invention, each action has associated with it a probability of success and a set of numerical effects. The execution of an action is considered a non-deterministic event, since one can rarely predict its outcome. In the case of an exploit, the execution of the exploit can be successful (in which case the attacker takes control of the target machine) or a failure.

It is noted that both numerical effects and the probability of success depend on the target host and other "environment conditions." For example, the IBM Tivoli exploit for CVE-2008-4828 has a higher probability of success if the OS of the host it targets is Solaris, because the stack is not randomized and is executable by default with no heap protection, rather than when the OS of the host it targets is Windows XP SP2 or Windows 2003 SP1, with Data Execution Prevention (DEP) enabled.

When executing a sequence of actions, say those described in an attack path, one can also estimate the compound numerical effect and probability of success of this path.

Let us assume that an infrastructure of networked computers and applications is fixed, and a description is provided. Computers and applications will be referred to as hosts. A goal for this infrastructure is also fixed, and the description is provided. It is assumed that a description of the actions, their requirements, numerical effects and estimates for their probability of success is also provided and that there exists at least one host where an agent is installed. It is also assumed that all this information is provided as input in a specific format, for example: the Planning Domain Definition Language. This is referred to herein as "the scenario."

The present system and method is provided within a network 2 of computer systems and applications, an example of which is provided by the schematic diagram of FIG. 1. FIG. 1 illustrates the presence of seven hosts 10, 50, 52, 54, 56, 58, 60, although it is noted that the present invention is not intended to be limited to a specific number of hosts. It should be noted that the hosts are also represented herein as H_1, H_2, H_3, H_4, H_5, H_6, and H_7. Each host has a different connectivity to other hosts within the network. As an example, hosts may be connected to other hosts via the Internet 66, direct physical connections from network devices 62, 64, virtual connections, or via use of other connection methods. In addition, certain hosts may in fact not be connected to a specific host within the network 2. Non-limiting examples of hosts may include, but are not limited to, computer systems, web servers, firewalls, routers, switches, voice over Internet protocol telephones, and other network devices. In addition, a host may be considered a Web application.

The functionality for probabilistic attack planning, in accordance with the present system and method, may be provided within one or more of the hosts of the network 2. For exemplary purposes, the present description provides the example of the functionality being provided within the first host 10 of the network 2, although the present invention is not intended to be limited to such an example. In addition, the following provides an example in which the first host 10 is a general computer, although it is noted that the first host 10 may instead be any network device or Web application, as described above.

Figure 2:
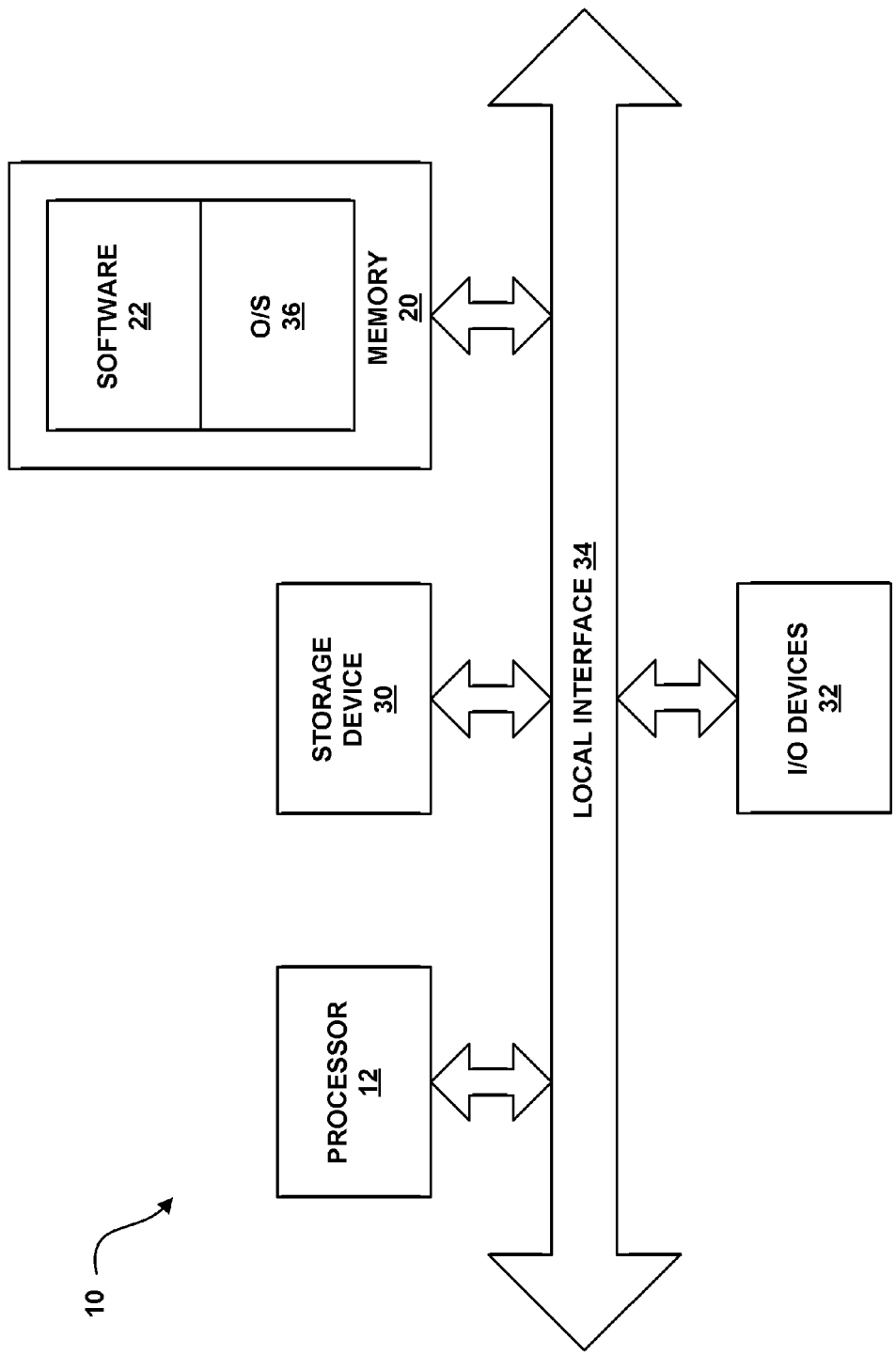
FIG. 2 is a block diagram further illustrating the first host of FIG. 1.

FIG. 2 is a block diagram further illustrating the first host 10 of FIG. 1, in accordance with a first exemplary embodiment of the invention. Functionality performed by the first host 10 is partially implemented in software, as an executable program, where the first host 10 may be a general-purpose digital computer, such as a personal computer (i.e., PC; IBM-compatible, Apple-compatible, or otherwise), workstation, minicomputer, or mainframe computer.

Generally, in terms of hardware architecture, as shown in FIG. 2, the first host 10 contains a processor 12, a memory 20, and one or more input and/or output (I/O) devices 32 (or peripherals) that are communicatively coupled via a local interface 34.

The local interface 34 can be, for example but not limited to, one or more buses or other wired or wireless connections, as is known in the art. The local interface 34 may have additional elements, which are omitted for simplicity, such as controllers, buffers (caches), drivers, repeaters, and receivers, to enable communications. Further, the local interface 34 may include address, control, and/or data connections to enable appropriate communications among the aforementioned components.

It should be noted that the first host 10 may also have a storage device (e.g., hard disk) 30 therein. The storage device 30 may be any nonvolatile memory element (e.g., ROM, hard drive, tape, CDROM, etc.). In accordance with an alternative embodiment of the invention, the storage device 30 may be a volatile memory element, although the loss of memory contents when power is removed, may not be desirable.

In accordance with the present invention, the storage device 30 has stored therein at least one scenario. As described above, each scenario includes a list of available actions, or basic steps of an attack, requirements for the actions to be performed, the probability of success of the action, the numerical effect of the action, information about hosts in the network, and a goal to be achieved by a penetration testing process against the described network. It should be noted, however, that in accordance with an alternative embodiment of the invention, data stored within the storage device 30 as described above, may instead be stored in a different location such as, for example, at a remote location.

The processor 12 is a hardware device for executing the software 22, particularly that stored in memory 20. The processor 12 can be any custom made or commercially available processor, a central processing unit (CPU), an auxiliary processor among several processors associated with the computer, a semiconductor based microprocessor (in the form of a microchip or chip set), a microprocessor, or generally any device for executing software instructions.

The memory 20 can include any one or combination of volatile memory elements (e.g., random access memory (RAM, such as DRAM, SRAM, SDRAM, etc.)) and nonvolatile memory elements. Moreover, the memory 136 may incorporate electronic, magnetic, optical, and/or other types of storage media. Note that the memory 20 can have a distributed architecture, where various components are situated remote from one another, but can be accessed by the processor 12.

The software 22 located in the memory 20 may include one or more separate programs, each of which contains an ordered listing of executable instructions for implementing logical functions. In the example of FIG. 2, as mentioned above, the software 22 includes functionality performed by the first host 10 in accordance with the present invention and possibly a suitable operating system (O/S) 36. The operating system 36 essentially controls the execution of other computer programs, such as the software 22 associated with the first host 10, and provides scheduling, input-output control, file and data management, memory management, and communication control and related services.

The software 22 is a source program, executable program (object code), script, or any other entity containing a set of instructions to be performed. When a source program, then the program needs to be translated via a compiler, assembler, interpreter, or the like, which may or may not be included within the memory 20, so as to operate properly in connection with the O/S 36. Furthermore, the software 22 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 32 may include input devices, for example but not limited to, a keyboard, mouse, scanner, microphone, touch screens, or other input devices. Furthermore, the I/O devices 32 may also include output devices, for example but not limited to, a printer, display, or other output devices. Finally, the I/O devices 32 may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the first host 10 is in operation, the processor 12 is configured to execute the software 22 stored within the memory 20, to communicate data to and from the memory 20, and to generally control operations of the first host 10 pursuant to the software 22. The software 22 and the O/S 36, in whole or in part, but typically the latter, are read by the processor 12, perhaps buffered within the processor 12, and then executed.

When at least a portion of the first host 10 is implemented in software 22, as is shown in FIG. 2, it should be noted that the software 22 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The software 22 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the first host 10 is implemented as a web application, the first host 10 may be hosted in a Web server, where the Web server may be a general-purpose digital computer, such as a personal computer (i.e., PC; IBM-compatible, Apple-compatible, or otherwise), workstation, minicomputer, or mainframe computer as described above.

In another alternative embodiment, where the first host 10 is implemented in hardware, the first host 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
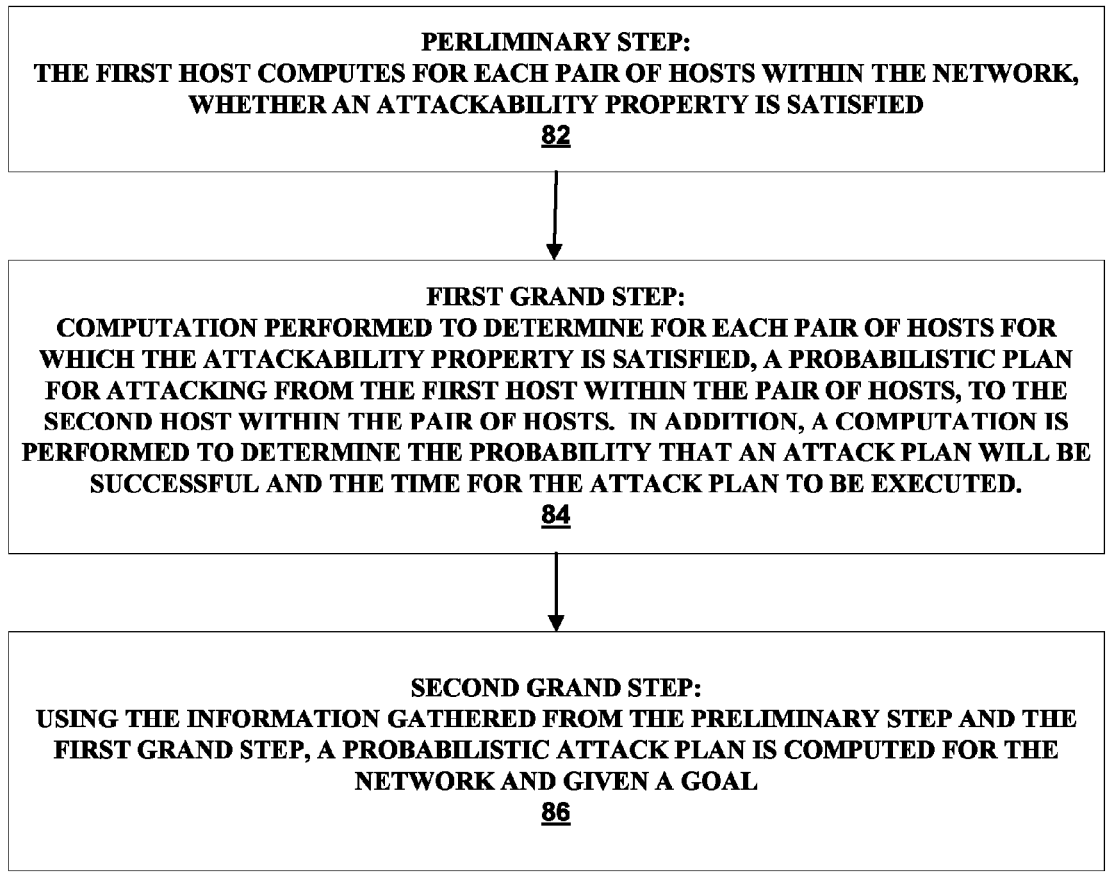
FIG. 3 is a flowchart illustrating steps taken in providing probabilistic attack planning, as performed by the first host of FIG. 2.

Having described a possible embodiment of a first host 10, the following provides a top-level description of functionality provided in accordance with the present invention. FIG. 3 is a flowchart 80 illustrating steps taken in providing probabilistic attack planning, as performed by the first host 10 of FIG. 2. In this regard, each block represents a module, segment, or portion of code, which contains one or more executable instructions for implementing the specified logical function(s). It should also be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved, as will be further clarified hereinbelow.

As shown by block 82, a preliminary step is performed. During the preliminary step, the first host 10 computes for each pair of hosts within the network 2, whether an attackability property is satisfied. As shown by block 84, a first grand step is then performed. During the first grand step a computation is performed to determine for each pair of hosts for which the attackability property is satisfied, a probabilistic plan for attacking from the first host within the pair of hosts, to the second host within the pair of hosts. In addition, during the first grand step a computation is performed to determine the probability that an attack plan will be successful and the time for the attack plan to be executed.

As shown by block 86, after completing the first grand step, a second grand step is performed by the first host 10. During the second grand step, using the information gathered from the preliminary step and the first grand step, a probabilistic attack plan is computed for the network 2 and a given goal.

Each of the abovementioned steps is described in further detail hereinbelow. Using the terminology of attack graphs, the solution of the "(deterministic) attack-planning problem" is that of, given a scenario, finding at least one attack path that leads to the goal (i.e., the state of the attack defined by this node should include the goal). An attack-planning problem typically has more than one solution. The "(deterministic) attack-planning problem optimizing a numerical effect" is defined as that of finding a solution that minimizes (or maximizes) a compound numerical effect. For example, finding the path that underlies less expected time of execution, or has less expectancy to be detected by control systems, or the traceability of the attack (dependent on the number of intermediate hops and topological factors).

As described and illustrated herein, a solution to the "probabilistic attack-planning problem with optimization" is a directed-acyclic graph with branches, an associated estimated probability of success p and an expected numerical effect t satisfying the following properties:

a) Nodes can be the "initial node or start node," "Success nodes," "Fail nodes," or one of various action nodes. There is one possible action node for each action described in the scenario.

b) The initial node is the first node of the graph, i.e., there are no inbound arrows and there is one outbound arrow. The Fail and Success nodes are only last nodes, i.e., there is an inbound arrow but no outbound arrows.

c) Each action node is followed by a branching in two action nodes, or a Fail node, or a Success node.

d) Every path from this graph that ends in the Success node stands for an attack path.

Furthermore, the probability that an automated run of the penetration test following the directed-acyclic graph succeeds is estimated by p and it has an expected numeric effect of t.

Even more, the optimization property means that, starting from any action node in the probabilistic plan, there may be several paths that lead to a Success node. Of these, the one underlying the smallest expected numerical effect is the one that starts in this action node, follows the arrows, and at each branching, when presented with a YES arrow and a NO arrow, it follows the YES arrow. For example, according to FIG. 17, the attack path with less numerical effect is the one going from A[2,1,1], to A[2,2,1], to A[1], to success. In addition, the attack path going from A[2,1,1], to A[2,1,2], to A[3], to success has bigger numerical effect.

Preliminary Step

The preliminary step includes running a module stored within the memory 20 over the scenario supplied as input to produce a list of ordered pairs of hosts where: the hosts are different; they are part of the target network; and they satisfy an "attackability property," as described below. Explicitly, the first host 10 performs a test for each ordered pair of hosts and answer YES if the pair of hosts satisfies the attackability property and NO if they do not. Hence, the output of this process is a list of ordered pairs of hosts that satisfy an attackability property.

Generally speaking, an ordered pair of hosts satisfies the "attackability property" if, given that a network agent is running in a first host of the pair of hosts there exists a set of actions that leads to installing a remote agent in a second host of the pair of hosts.

As an example, assuming that a first host in the pair of hosts is referred to as H_1 and a second host in the pair of hosts is referred to as H_2, one test will check if host H_1 can reach host H_2 through the network 2 according to the scenario description stored within the storage device of the first host 10 (because in this case host H_1 may attempt to execute a remote exploit against host H_2). This problem is considered and solved, for example, in the co-pending US Application entitled, "System and method for extending automated penetration testing to develop an intelligent and cost efficient security strategy," by Sarraute et al., having application Ser. No. 12/851,516, which was filed Aug. 5, 2010, and which is incorporated by reference in its entirety herein.

A second example is to test if the email address for one of the users of host H_2 is known and host H_1 is able to send emails, because in this case host H_1 may attempt a client-side attack against host H_2, as an example, by sending an email to a user of host H_2 or initiating an instant messaging communication with a user of host H_2. Again, this problem is considered and solved in US Application "System and method for extending automated penetration testing to develop an intelligent and cost efficient security strategy."

One having ordinary skill in the art may understand how to define more tests depending on the technologies used in the target network and the available actions.

Figure 4:
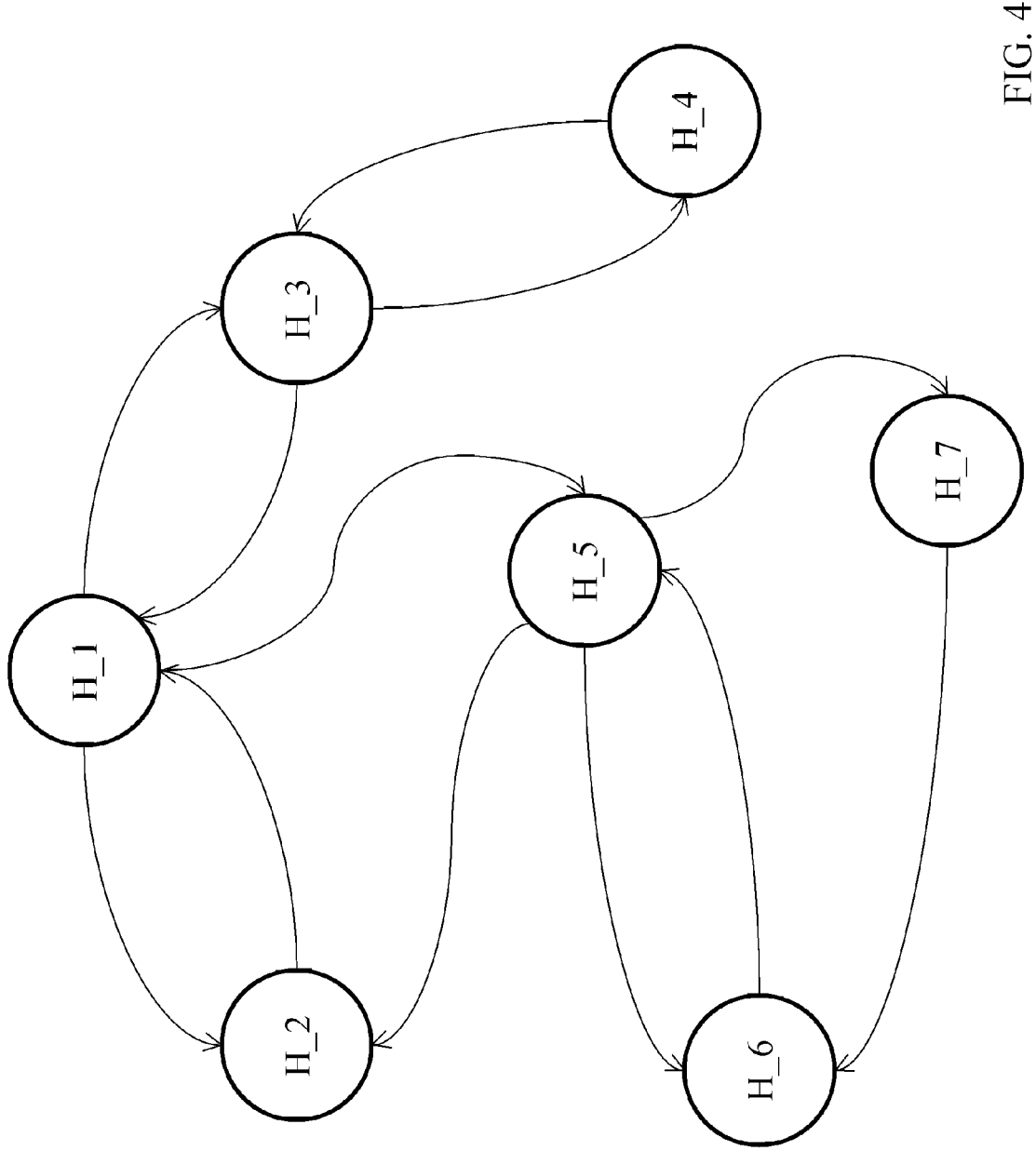
FIG. 4 is an attackability graph for hosts.

According to an example with a network 2 having seven (7) hosts, as illustrated by FIG. 1, and as is represented herein as H_1 through H_7, FIG. 4 is an attackability graph for the hosts. Referring to FIG. 4, the following pairs of hosts satisfy the attackability property: (H1,H_2); (H_1,H_3); (H_2,H_1); (H_3,H_1); (H_3,H_4); (H_4,H_3); (H_5,H_2); (H_5,H_6); (H_5,H_7); (H_6,H_5); (H_7,H_6). All other ordered pairs do not satisfy the attackability property.

First Grand Step

The first grand step includes running a second module stored within the memory 20 for each ordered pair of hosts produced by the first module. The input for the second module is the scenario and identification for the two hosts in the scenario, which stand for the first host and the second host in one of these ordered pairs. The second module receives as additional input the numerical effect to be optimized. The second module produces a probabilistic plan, for which the goal is installing an agent in the second host of the pair, and that optimizes the numerical effect and only uses actions that are run from the first host against the second host.

The following description is with regard the pair of hosts being Host H_1 and host H_2. It should be noted, however, that this process may be provided for any other pair of hosts that satisfy the attackability property.

Figure 5:
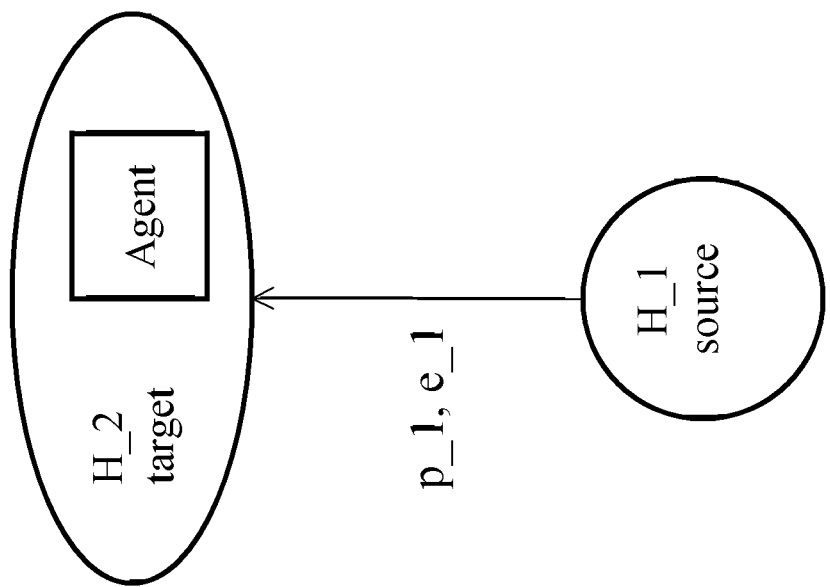
FIG. 5 is a schematic diagram illustrating that there is at least one method for attacking the second host H_2 from the first host H_1.

According to the present invention, as shown in FIG. 5, there is at least one method for attacking the second host H_2 from the first host H_1. The objective is to compute the solution to the probabilistic attack-planning problem where the scenario is defined by the original scenario with the following changes: the goal is set to install a remote agent in host H_2; and, the network description is stripped of all the information that is not directly related to H_1 or H2.

The step of computing the solution to the probabilistic attack-planning problem makes use of the following two functionalities. First, given an action (basic step of an attack), the first functionality answers if requirements of the action are satisfied according to the scenario (description). Given a requirement that is not satisfied according to the scenario (description), the second functionality computes the identifiers within the scenario for those actions that, if executed, answer if the requirements of the action are satisfied or not (in case one such action is included in the scenario; else it answers that the requirement cannot be checked). Implementations for both functionalities were described in the invention covered in the US patent application entitled, "System and method for extending automated penetration testing to develop an intelligent and cost efficient security strategy," by Sarraute et al.

Figure 6:
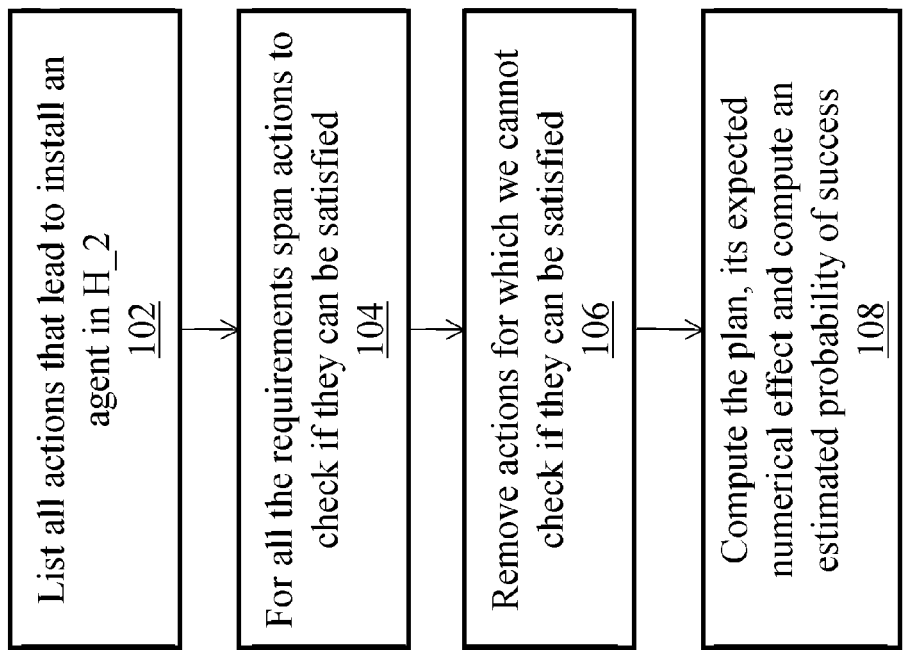
FIG. 6 is a flowchart further illustrating steps performed in the first grand step, in accordance with the present invention.
Figure 7:
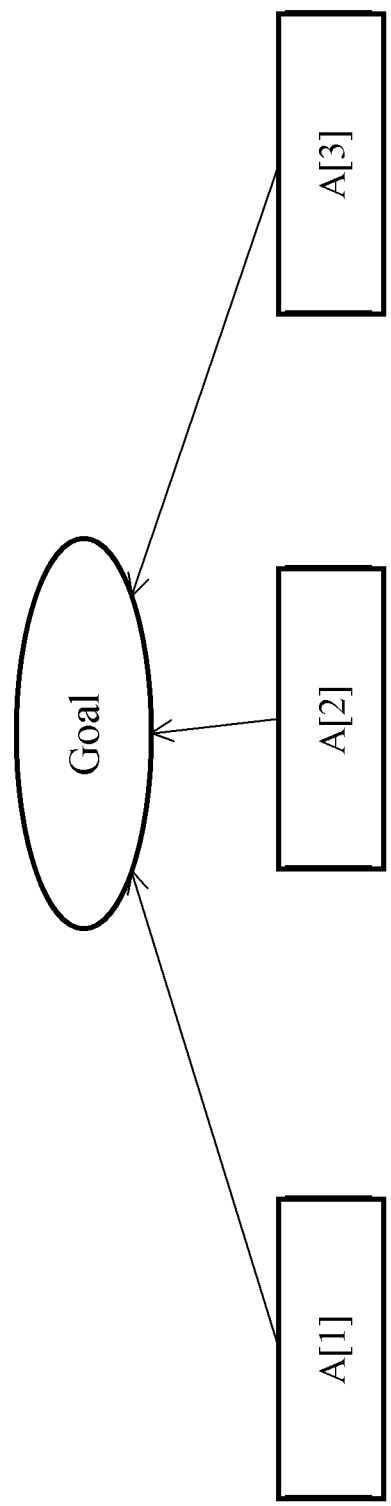
FIG. 7 is a schematic diagram depicted the host H_1 finding three actions, A[1], A[2] and A[3], whose result is "installing a remote agent in host H_2," which is the goal.

FIG. 6 is a flowchart further illustrating steps performed in the first grand step, in accordance with the present invention. As shown by block 102, the host H_1 lists all the actions that can be used to install an agent in host H_2. The host H_1 then checks if the requirements for these actions are satisfied or not (block 104). Sometimes the requirements will be satisfied, in which case the actions will take part in the final plan, and sometimes the requirements will not be satisfied and these actions will not be included in the plan. As shown by block 106, actions for which one cannot check if the requirements can be satisfied, are removed from the list. For those cases that the requirements are not satisfied, it may be the case that the scenario includes an action that can check whether they are satisfied or not. In this case, again, this new action may have satisfied or unsatisfied requirements.

By recursively continuing in this fashion, the process is concluded by listing sequences of actions where the order is such that the requirements of an action are checked by the preceding actions or are satisfied according to the description of the scenario. However, the host H_1 will not only do this, but also order the actions in such a way that the order of actions is the best possible order, that is, every other order will have a bigger expected numerical effect (for example, when the numerical effect considered is time, this will mean running the actions in the order specified is expected to take less time than running the actions in other orders). Further, it will provide an estimate for the probability that the plan succeeds and an expected numerical effect.

The following provides a non-limiting example of implementing the first grand step, in accordance with the present invention. The present invention is not intended to be limited to this implementation. The first step includes constructing all of the possible attack paths. The host H_1 will compute a list of sequences of actions, the compound numerical effect, and an estimate for the probability of success of the plan. Host H_1 starts with T=0 and P=0.

The following exemplary notation is used during the description of the First Grand Step. Denote by n the number of actions that have as a consequence installing a remote agent in host H2, and denote these actions as a[1,1], . . . , a[1,n]. These actions have associated numerical effects t[1,1], . . . , t[1,n] and estimated probabilities p[1,1], . . . , p[1,n] respectively. Next, we let A[1] denote any of these actions. As previously explained, this action has certain requirements and it may be the case that the scenario description does not allow one to decide if one of these actions is satisfied or not. Denote by m the number of unsatisfied requirements, and denote these requirements as R[2,1], . . . , R[2,m]. In turn, for each of these requirements there may be different actions that can check if they are satisfied. Once we fix one of these requirements, say R[2,i], we denote by N the number of actions that can check if this is satisfied or not. In addition, we denote these actions by a[2,i,1], . . . , a[2,i,N], we denote their associated numerical effects by t[2,i,1], . . . , t[2,i,N], and we denote associated probabilities by p[2,i,1], . . . , p[2,i,N]. Finally, the estimated numerical effect associated to running sequentially the actions a[2,i,1], . . . , a[2,i,N] until one is successful is T[2,i] and the probability that at least one succeeds is P[2,i].

Host H_1 executes the following steps:

1. For the first step, at level 1, it is assumed that there are n actions that may install an agent in host H_2 with whatever requirements. Each of these actions has associated with it an expected numerical effect t and an estimated probability of success p. The host computes the quotients t/p and orders the actions in a list a[1,1], . . . , a [1,n] such that t[1,1]/p[1,1]<t[1,2]/p[1,2]< . . . <t[1,n]/p[1,n].

Figure 26:
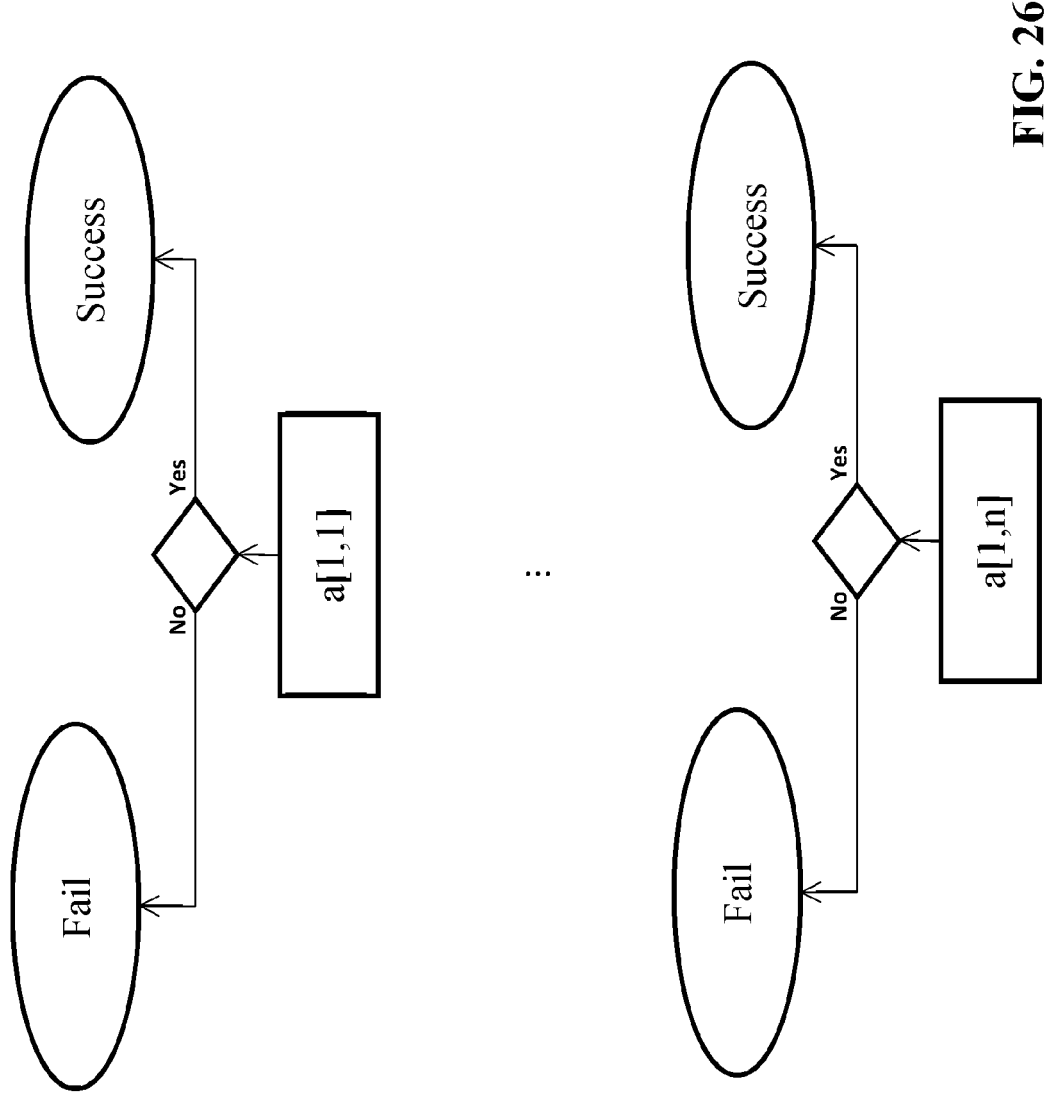
FIG. 26 is a schematic diagram illustrating that for each of the nodes, the host H_1 draws an arrow that starts in this node and goes to a branching, where the YES branch goes to the Success node and the NO branch goes to the Fail node.

1.a Also, the host H_1 starts to define the probabilistic plan. The host H_1 adds nodes labeled as a[1,1], . . . , a[1,n] to the probabilistic plan. For each of these nodes, the host H_1 draws an arrow that starts in this node and goes to a branching, where the YES branch goes to the Success node and the NO branch goes to the Fail node. This is illustrated by the schematic diagram of FIG. 26.

2. As a second step, we move to level 2 and for each action that comes from the previous level the following steps are executed.

2.a One action is fixed and denoted by A[1].

2.b The host H_1 checks if the requirements for this action are satisfied according to the scenario description.

2.b.i If the requirements are satisfied, the Host H_1 calls the branch underlying this action as ended. In addition, if t is the expected numerical effect of action A[1] and p is the estimated probability of success of this action then it redefines T=T+t and P=P+(1−P)*p, and continues with the following action in 2.a (if all the actions have been examined, it ends).

2.b.ii Else, if some of the requirements are not satisfied according to the scenario, these unsatisfied requirements are denoted as R[2,1], . . . , R[2,m].

2.b.iii One requirement is fixed, which is denoted by R[2,i] (where i represents any of 1, . . . , m).

3. As a third step, host H_1 searches for the actions that, when run, answer if requirement R[2,i] is satisfied.

3.a If no actions can tell the host H_1 if requirement R[2,i] is satisfied, then host H_1 calls the branch underlying action A[1] as ended, it removes action A[1] from the list, and continues with the following action. Then, host H_1 returns to 2.a.

3.b Else, there is at least one action that can check if requirement R[2,i] is satisfied.

3.b.i At the third level, let us say that there are N actions that can check if requirement R[2,i] is satisfied. Each of these actions has associated with it an expected numerical effect t and an estimated probability of success p. The host H_1 computes the quotients t/p and orders the actions in a list a[2,i,1], . . . , a[2,i,N] such that t[2,i,1]/p[2,i,1]<t[2,i,2]/p[2,i,2]< . . . <t[2,i,N]/p[2,i,N]. Then, the host H_1 associates to requirement R[2,i] the sequence of actions a[2,i,1], . . . , a[2,i,N] and also, the estimated probability of success as represented by equation 1 below, $$P[2,i]=p[2,i,1]+(1-p[2,i,1])*p[2,i,2]+(1-p[2,i,1])*(1-p[2,i,2])*p[2,i,3]+ \ldots +(1-p[2,i,1])* \ldots *(1-p[2,i,N-1])*p[2,i,N]$$ (Eq. 1)

and the expected numerical effect as represented by equation 2 below, $$T[2,i]=t[2,i,1]+(1-p[2,i,1])*t[2,i,2]+(1-p[2,i,1])*(1-p[2,i,2])*t[2,i,3]+ \ldots +(1-p[2,i,1])* \ldots *(1-p[2,i,N-1])*t[2,i,N]$$ (Eq. 2).

If the requirements for all the actions a[2,i,1], . . . , a[2,i,N] are satisfied, we continue with step 4. Otherwise, for each action with unsatisfied requirements, we recursively apply the procedure that starts in step 2.a with each of these actions, that is, we define the requirements for the actions in level 3, list the actions that are required to check if these requirements are satisfied, and so on and so forth.

4. As a fourth step, once the host H_1 covered all the requirements, say R[2,1], . . . , R[2,N], it will order the requirements according to the quotients T[2,i]/(1−P[2,i]). Let us assume (relabeling them if necessary) that the requirements R[2,1], . . . , R[2,m] are ordered so that R[2,1]/(1−P[2,1])<R[2,2]/(1−P[2,2])< . . . <R[2,m]/(1−P[2,m]).

4.a Host H_1 continues defining the probabilistic plan:

4.a.i It adds nodes for the actions A[2,1,1], . . . , A[2,1,m] that check requirement R[2,1], and the same for the actions that check requirements R[2,2] through R[2,m].

4.a.ii Next, it draws an arrow that starts in node A[2,1,1] and goes to a branching, where the YES branch goes to the A[2,2,1] node and the NO branch goes to node A[2,1,2]; it draws an arrow that starts in node A[2,1,2] and goes to a branching, where the YES branch goes to the A[2,2,1] node and the NO branch goes to node A[2,1,3]; it draws an arrow that starts in node A[2,1,3] and goes to a branching, where the YES branch goes to the A[2,2,1] node and the NO branch goes to node A[2,1,4]; et cetera. After repeating this for N times, it draws an arrow that starts in node A[2,1,N] and goes to a branching, where the YES branch goes to the A[1] node and the NO branch goes to the either the next action of level 1, if there remains one such action, or to the Fail node if no actions remain.

4.a.iii Next, it draws an arrow that starts in node A[2,2,1] and goes to a branching, where the YES branch goes to the A[2,3,1] node and the NO branch goes to node A[2,2,2]; it draws an arrow that starts in node A[2,2,2] and goes to a branching, where the YES branch goes to the A[2,3,1] node and the NO branch goes to node A[2,2,3]; it draws an arrow that starts in node A[2,2,3] and goes to a branching, where the YES branch goes to the A[2,3,1] node and the NO branch goes to node A[2,2,4]; et cetera. After repeating this for N times, it draws an arrow that starts in node A[2,3,N] and goes to a branching, where the YES branch goes to the A[2,4,1] node and the NO branch goes to the either the next action of level 1, if there remains one such action, or to the Fail node if no actions remain.

4.a.iv Note that step 4.a.ii is associated with requirement R[2,1] and step 4.a.iii is associated to requirement R[2,2]. Next, we continue similarly with requirements R[2,3], . . . , R[2,m,1]. For requirement R[2,m] the following is executed: it draws an arrow that starts in node A[2,m,1] and goes to a branching, where the YES branch goes to the A[1] node and the NO branch goes to node A[2,m,2]; it draws an arrow that starts in node A[2,m,2] and goes to a branching, where the YES branch goes to the A[1] node and the NO branch goes to node A[2,m,3]; it draws an arrow that starts in node A[2,m,3] and goes to a branching, where the YES branch goes to the A[1] node and the NO branch goes to node A[2,m,4]; et cetera. After repeating this for N times, it draws an arrow that starts in node A[2,m,N] and goes to a branching, where the YES branch goes to the A[1] node and the NO branch goes to the either the next action of level 1, if there remains one such action, or to the Fail node if no actions remain. Further, the host H_1 assigns to this sequence of actions the estimated probability of success represented by equation 3 below, $$p=(P[2,1]*P[2,2]* \ldots *P[2,m])*P[1] \quad \text{(Eq. 3)}$$

and the expected time as represented by equation 4 below $$t=(T[2,1]+T[2,2]+\ldots+T[2,m])+T[1] \quad \text{(Eq. 4)}$$

The host H_1 then assigns T=T+t, P=P+(1−P)*p. If the host H_1 reaches this point, it returns to step 2.a. One arrow is then added from the start node to the only action node that has no inbound arrows.

FIGS. 7-16 are schematic diagrams illustrating an exemplary use of the host H_1 in accordance with the manner described above. In executing the first step (1), according to the example depicted in FIG. 7, the host H_1 finds three actions, A[1], A[2] and A[3], whose result is "installing a remote agent in host H_2" which is the goal.

Also, host H_1 adds a start node and nodes A[1], A[2] and A[3] to the attack plan. It adds three branches, one for each action node, where the YES branch goes to the Success node and the NO branch goes to the Fail node.

Figure 8:
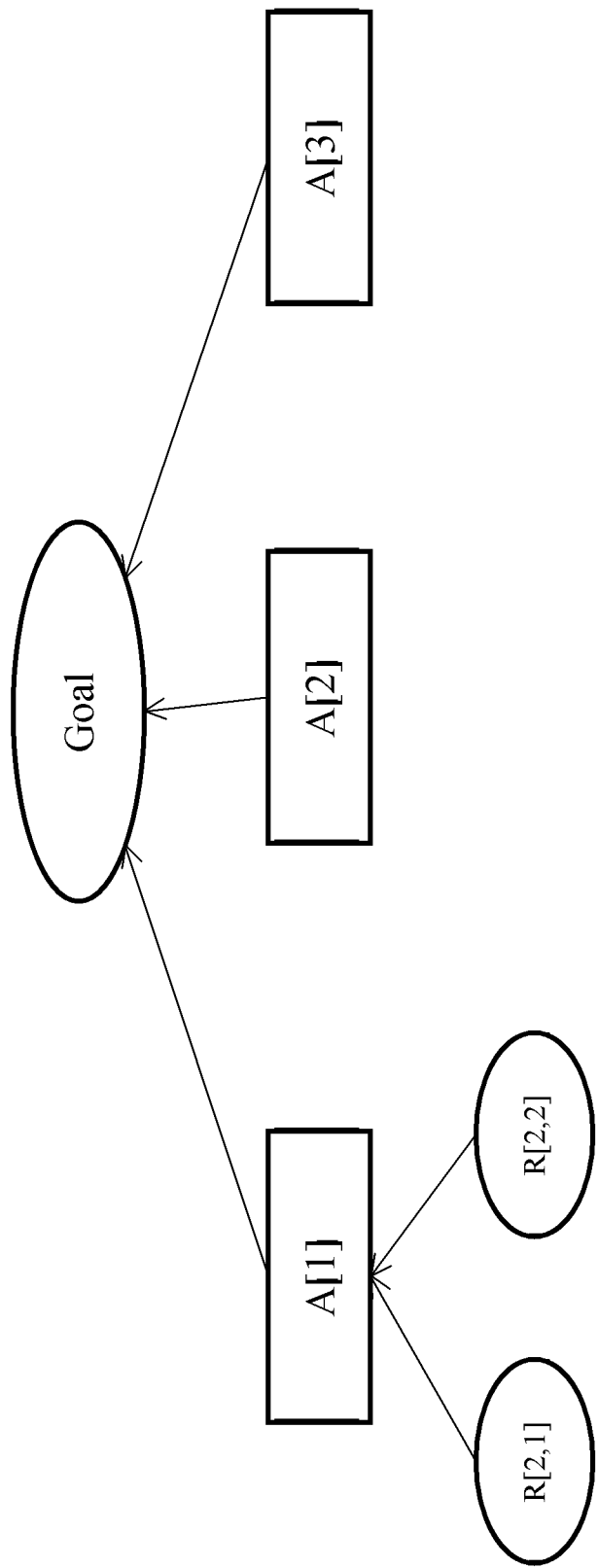
FIG. 8 is a schematic diagram illustrating the result of starting step 2.b for action A[1].
Figure 9:
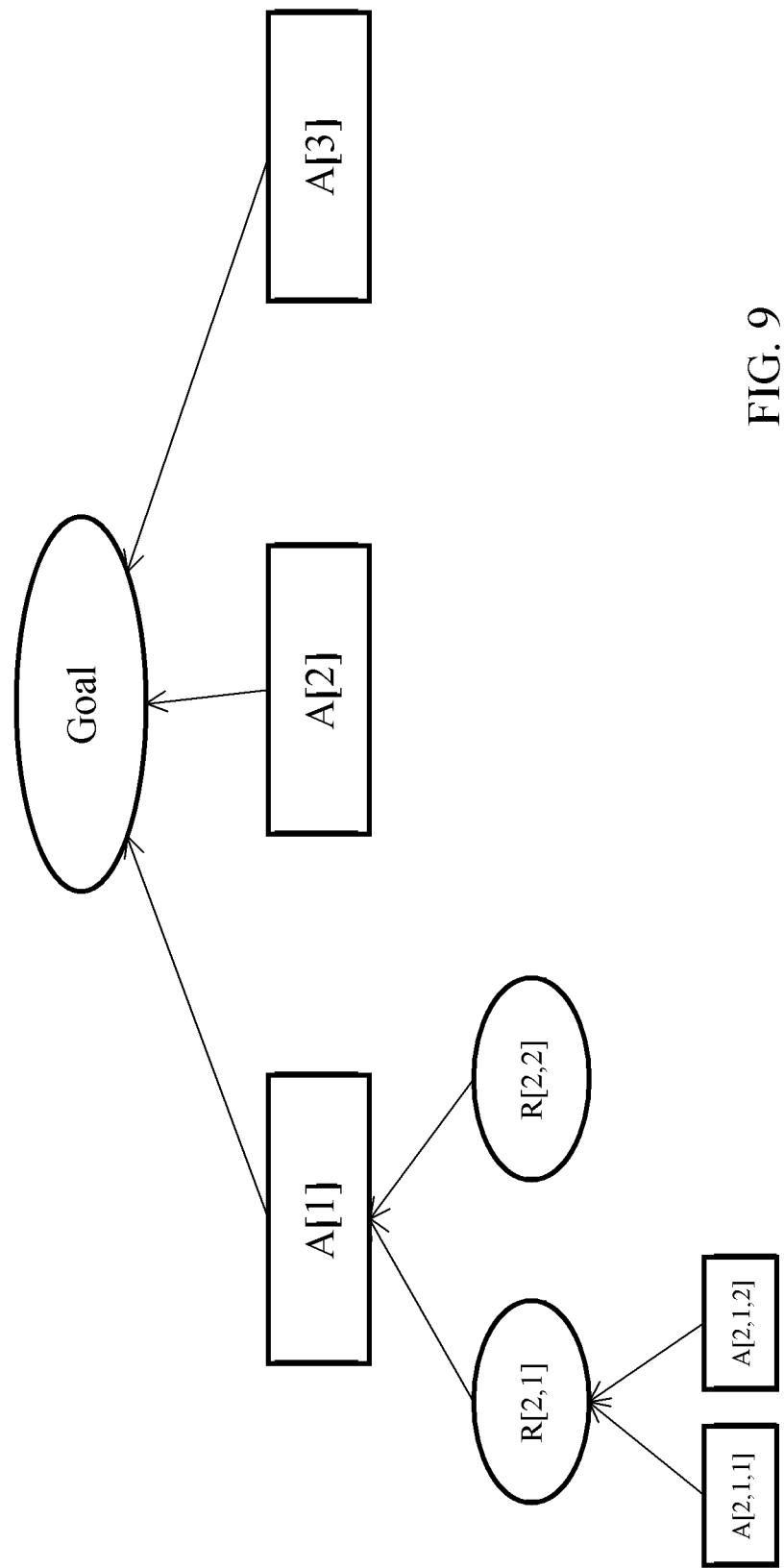
FIG. 9 is a schematic diagram illustrating that in order to obtain requirement R[2,1] one needs to execute either action A[2,1,1] or action A[2,1,2].

The schematic diagram of FIG. 8, illustrates the result of starting step 2.b for action A[1]. The host H_1 finds that there are two unsatisfied requirements, R[2,1] and R[2,2], that need to be satisfied in order to run A[1].

When the host H_1 reaches step 2.b.i and realizes that there remains unsatisfied requirements, the host H_1 then continues to step 2.b.ii. As illustrated by the schematic diagram of FIG. 9, and according to the third step (3), it is illustrated that in order to obtain requirement R[2,1] one needs to execute either action A[2,1,1] or action A[2,1,2]; hence, there is nothing to do in step 3.a.

Figure 10:
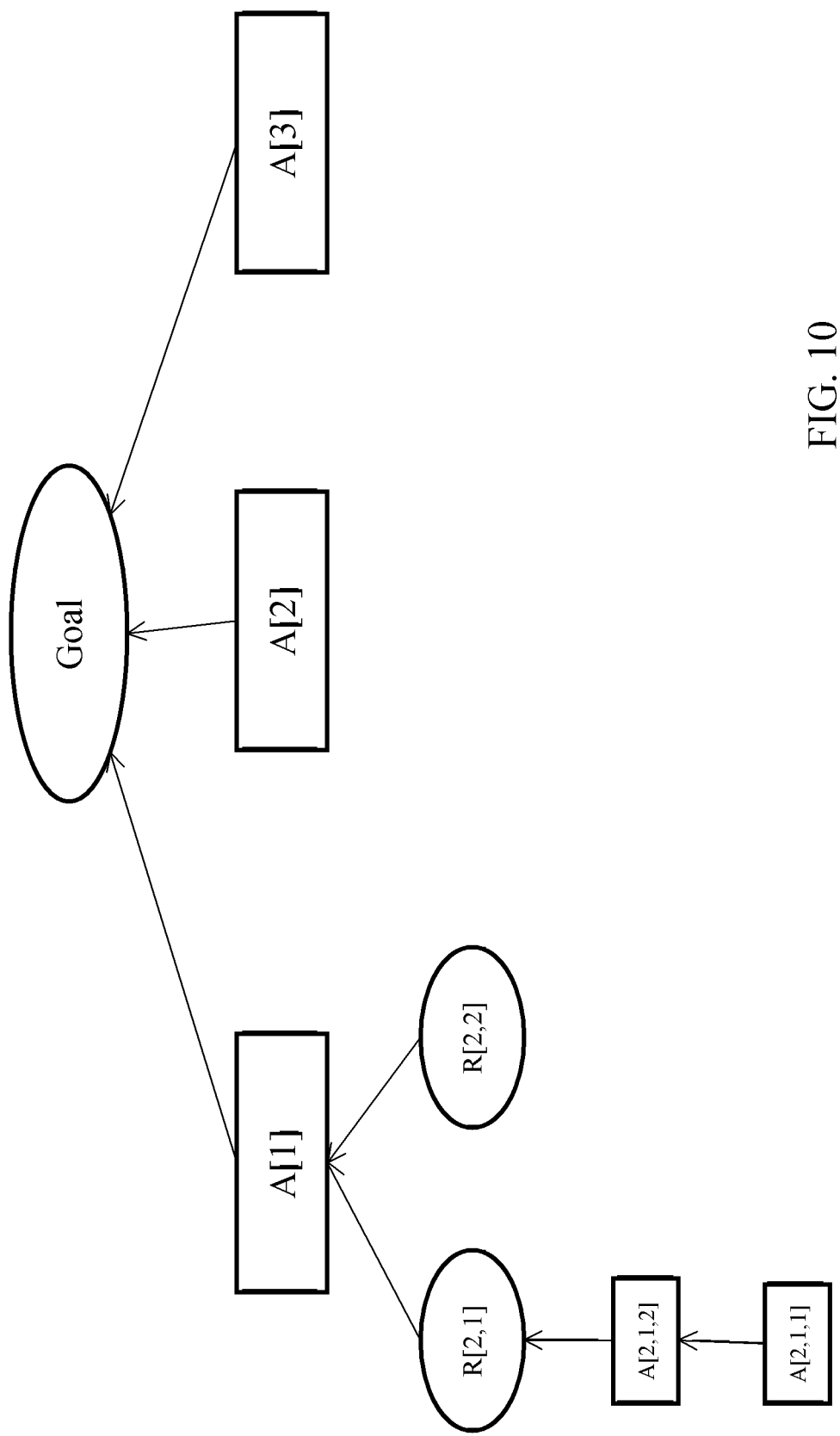
FIG. 10 is a schematic diagram illustrating reordering due to, during the execution of step 3.b.i, the host H_1 realizing that t[2,1,1]/p[2,1,1]<t[2,1,2]/p[2,1,2] and hence reordering the actions.

During the execution of step 3.b.i the host H_1 realizes that t[2,1,1]/p[2,1,1]<t[2,1,2]/p[2,1,2] and hence reorders the actions as depicted in the schematic diagram of FIG. 10. Further, since the requirements for actions A[2,1,1] and A[2,1,2] are satisfied, in step 3.b.i the host H_1 computes P[2,1]=p[2,1,1]+(1−p[2,1,1])*p[2,1,2] and T[2,1]=t[2,1,1]+(1−p[2,1,1])*t[2,1,2]. Next, the host H_1 continues with the loop moving to step 2.b.iii for action A[2,2].

Figure 11:
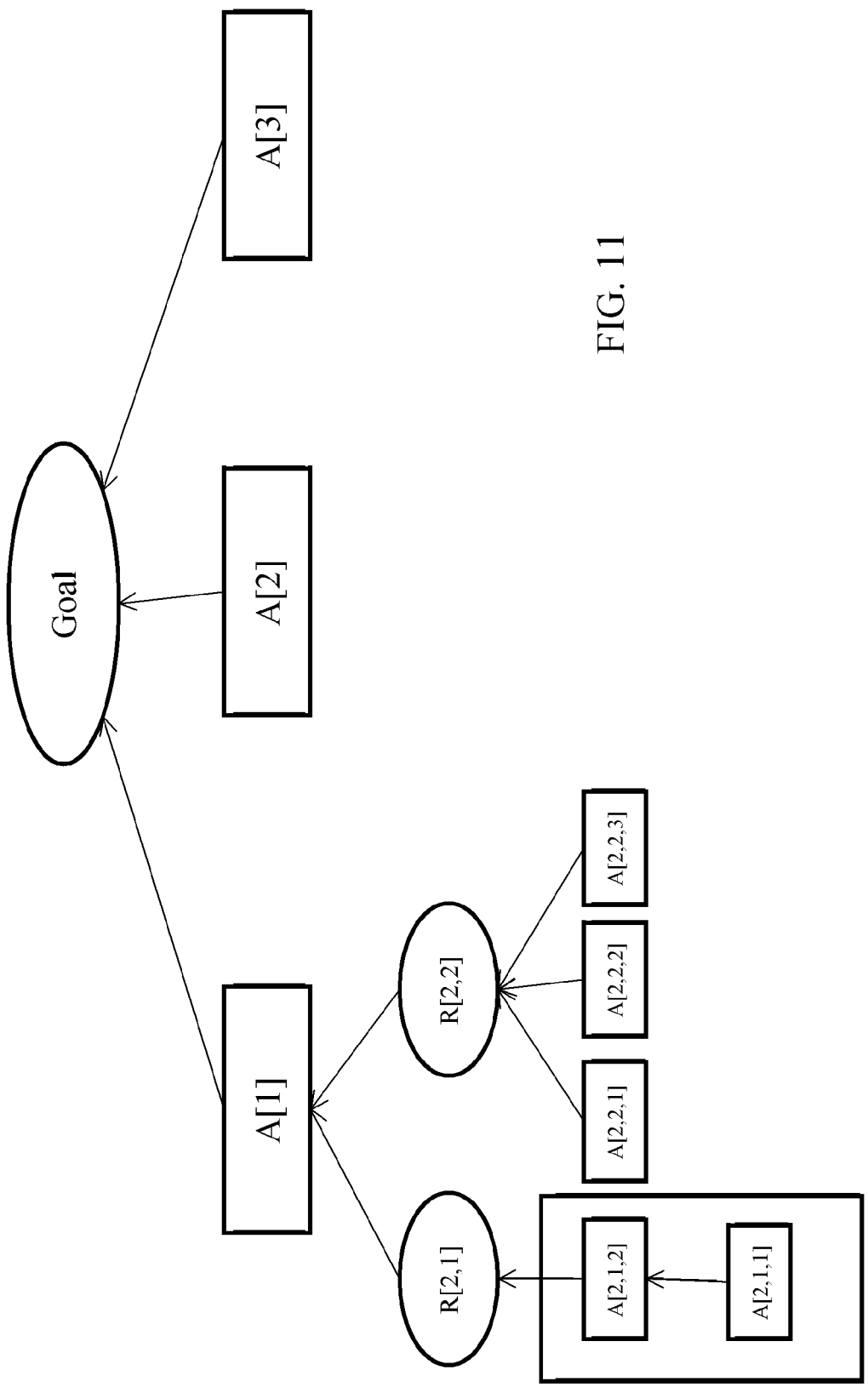
FIG. 11 is a schematic diagram illustrating that the host H_1 finds three actions A[2,2,1], A[2,2,2], and A[2,2,3], any of which can check if requirement R[2,2] is satisfied.
Figure 12:
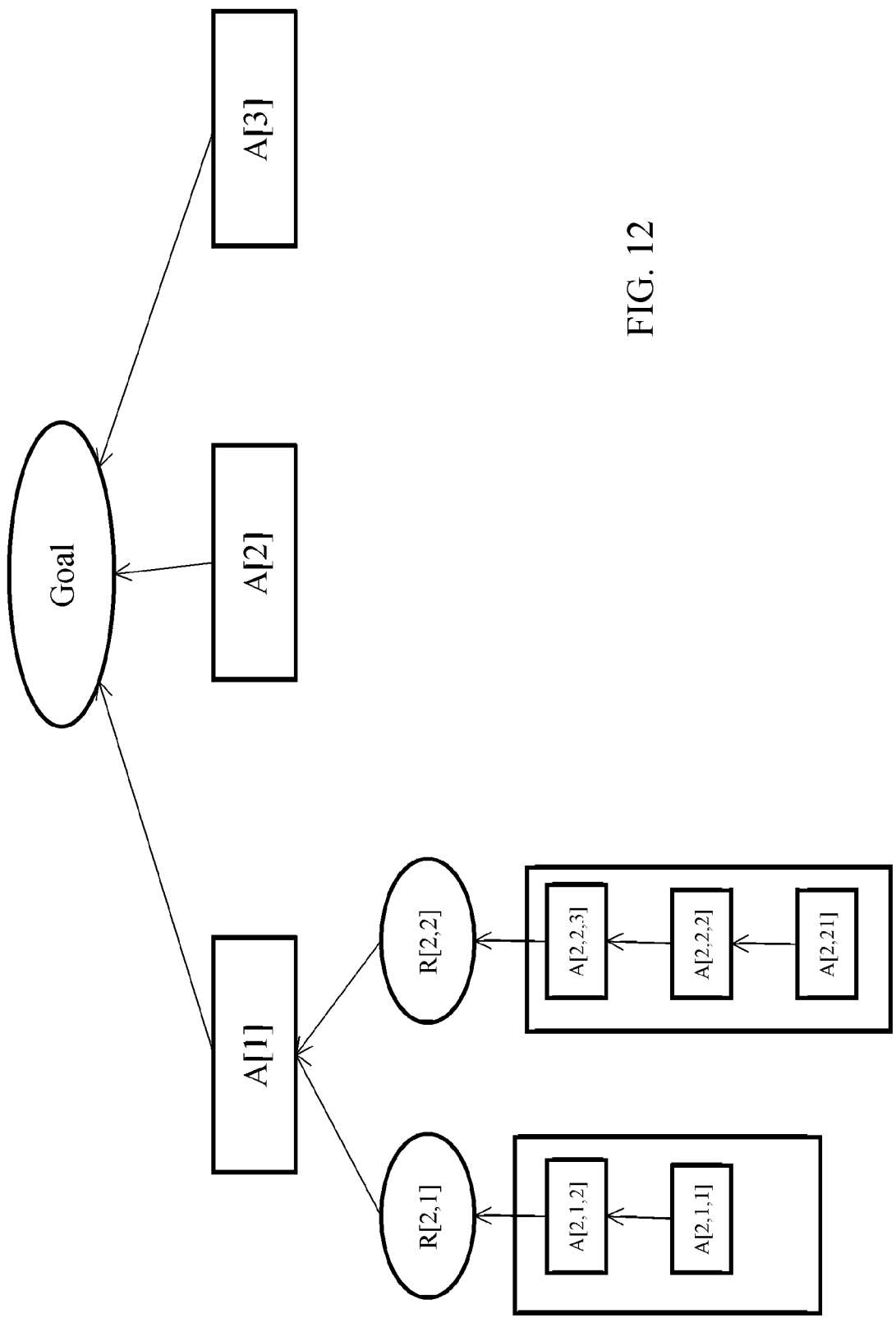
FIG. 12 is a schematic diagram illustrating a reordering of the actions due to, in step 3.b.i, the host H_1 computing the quotients t[2,2,1]/p[2,2,1], t[2,2,2]/p[2,2,2], t[2,2,3]/p[2,2,3] and deciding to reorder the actions.
Figure 13:
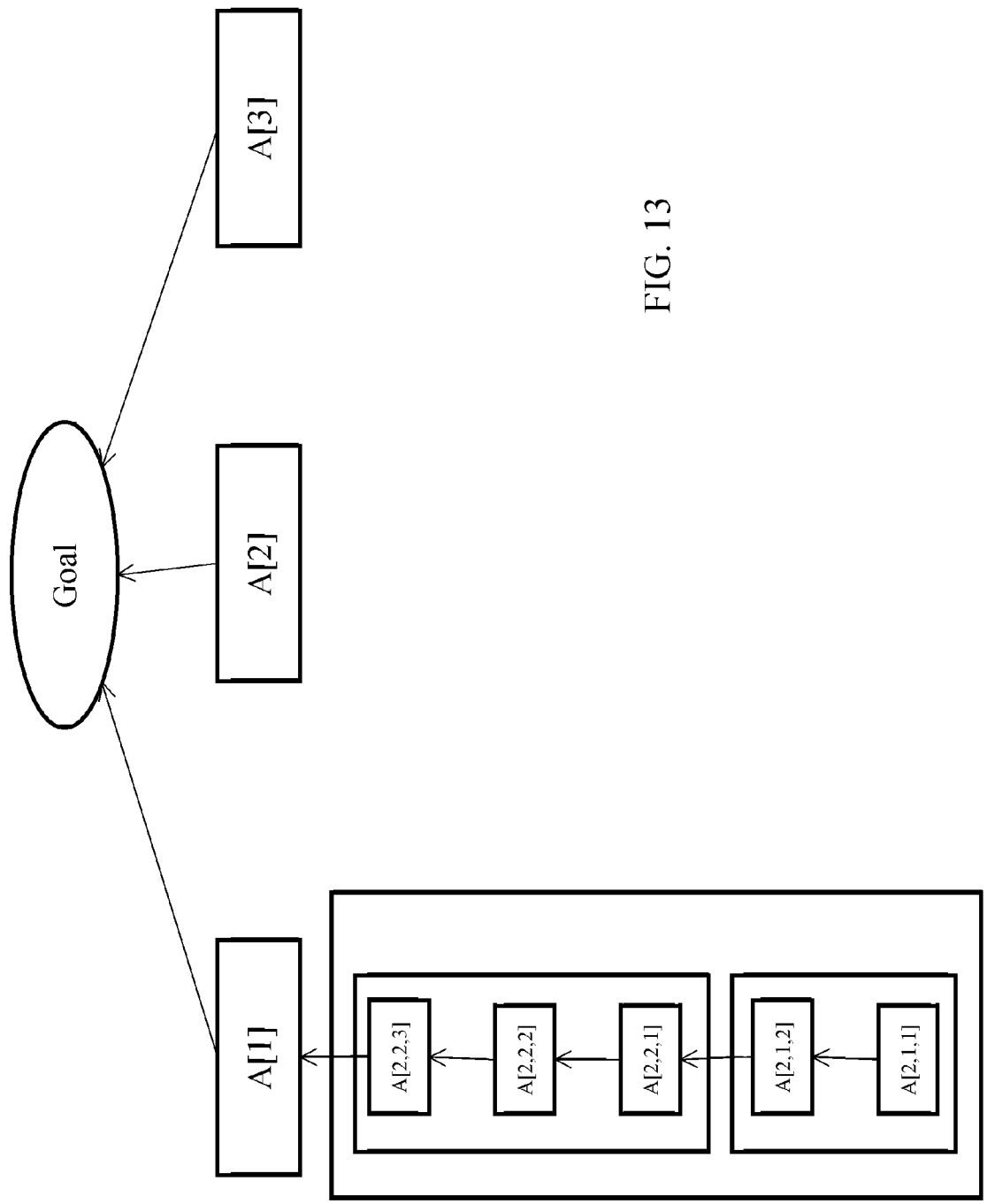
FIG. 13 is a schematic diagram illustrating a reordering of the actions due to computing the quotients T[2,1]/(1−P[2,1]) and T[2,2]/(1−P[2,2]) and deciding to reorder the actions.

According to the example, as illustrated by the schematic diagram of FIG. 11, one can see that the host H_1 finds three actions A[2,2,1], A[2,2,2], and A[2,2,3], any of which can check if requirement R[2,2] is satisfied (this is the third step (3)).

Again, the host H_1 finds that the requirements for executing each of these actions are satisfied (step 3.b). In step 3.b.i the host H_1 computes the quotients t[2,2,1]/p[2,2,1], t[2,2,2]/p[2,2,2], t[2,2,3]/p[2,2,3] and decides to reorder the actions as shown in the schematic diagram of FIG. 12: first action A[2,2,1]; then action A[2,2,2]; and finally action A[2,2,3]. In step 3.b.ii the host H_1 computes P[2,2]=p[2,2,1]+(1−p[2,2,1])*p[2,2,2]+(1−p[2,2,1])*(1−p[2,2,2])*p[2,2,3] and T[2,2]=t[2,2,1]+(1−p[2,2,1])*t[2,2,2]+(1−p[2,2,1])*(1−p[2,2,2])*p[2,2,3].

The host H_1 then moves to the fourth step (4). According to the example, one computes the quotients T[2,1]/(1−P[2,1]) and T[2,2]/(1−P[2,2]) and decides to reorder the actions as shown in the schematic diagram of FIG. 13. Specifically, assuming that the first quotient T[2,1]/(1−P[2,1]) is smaller than the second quotient T[2,2]/(1−P[2,2]), action items for requirement R[2,1] are placed before action items for requirement R[2,2]. The host H_1 also determines that the branch underlying action A[1] is ended and assigns to this branch the probability of success P[1,1]=P[2,1]*P[2,2]*p[1,1] and the numerical effect T[1,1]=T[2,1]+T[2,2]+t[1,1]. Here, P[2,1]= p[2,1,1]+(1−p[2,1,1])*p[2,1,2], T[2,1]=t[2,1,1]+(1−p[2,1,1])*t[2,1,2], P[2,2]=p[2,2,1]+(1−p[2,2,1])*p[2,2,2]+(1−p[2,2,1])*(1−p[2,2,2])*p[2,2,3] and T[2,2]=t[2,2,1]+(1−p[2,2,1])*t[2,2,2]+(1−p[2,2,1])*(1−p[2,2,2])*t[2,2,3] and continue with step 2 applied to action A[2].

Figure 14:
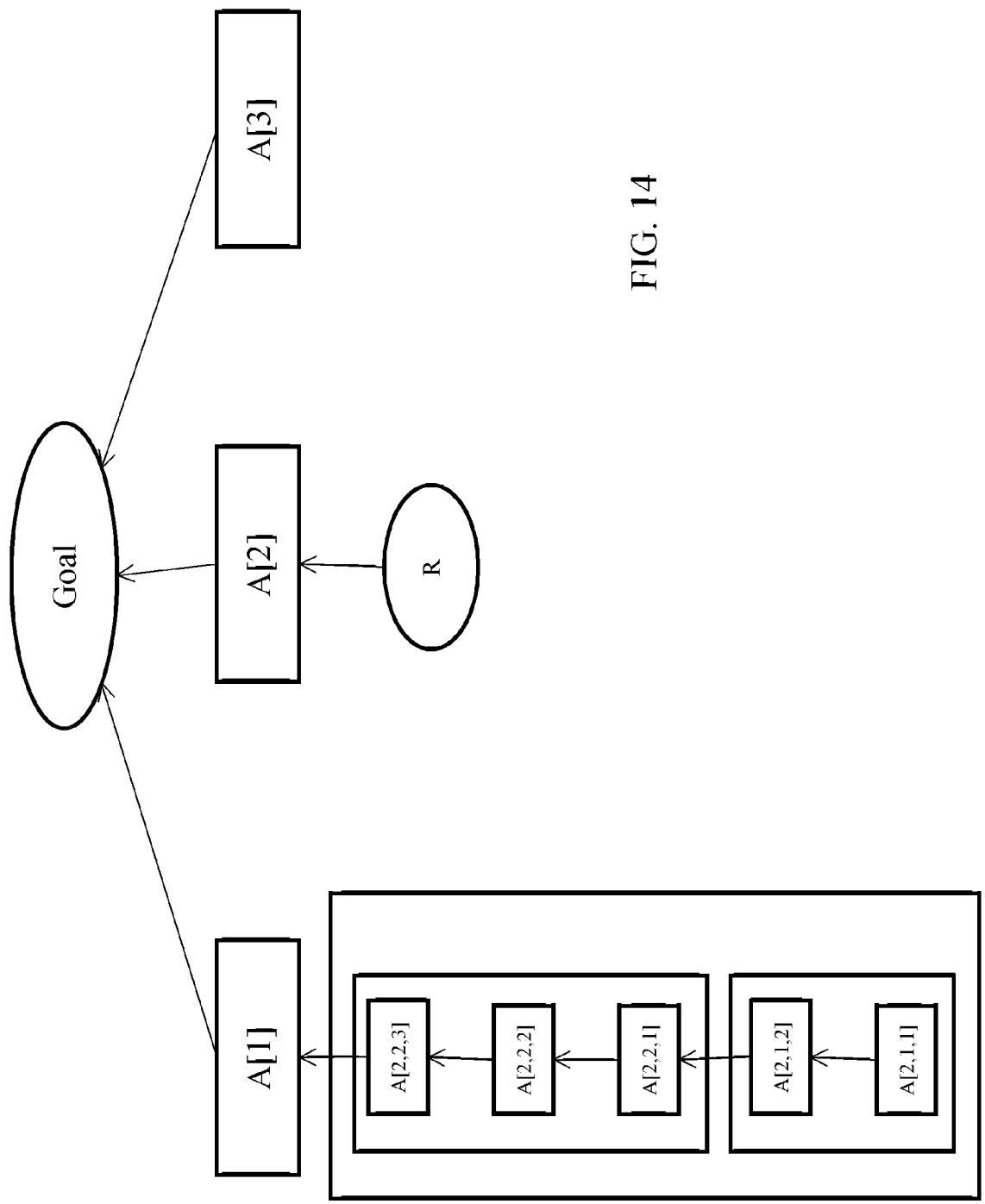
FIG. 14 is a schematic diagram illustrating that there exists one unsatisfied requirement R for executing action A[2].
Figure 15:
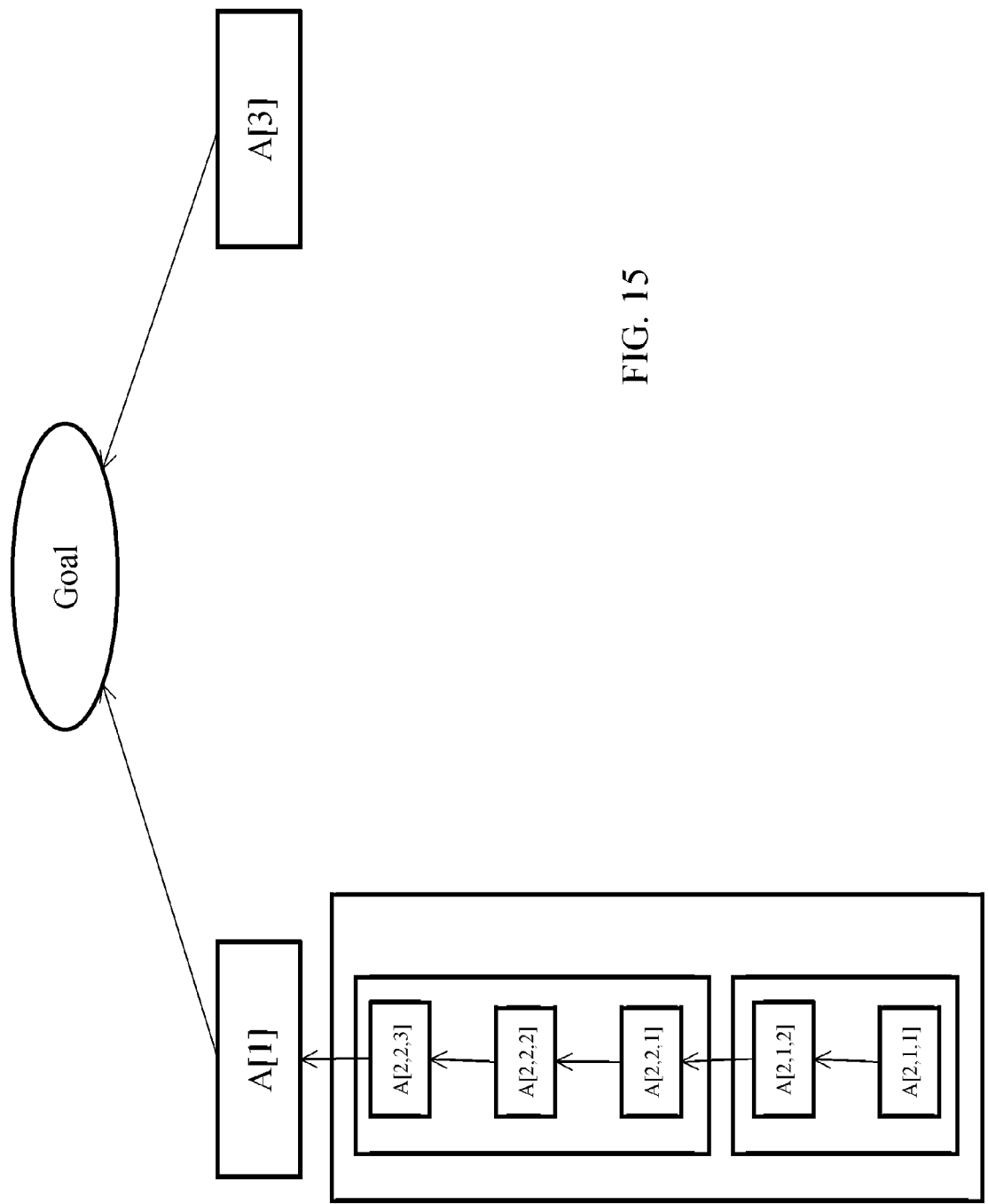
FIG. 15 is a schematic diagram illustrating that the host H_1 removes action A[2] and continues to step 2.b

As shown by the schematic diagram of FIG. 14, there exists one unsatisfied requirement R for executing action A[2]. Then, as shown by the schematic diagram of FIG. 15, the host H_1 removes action A[2] and continues to step 2.b.

The host H_1 now moves to run step 2 applied to action A[3]. As illustrated by the schematic diagram of FIG. 16, the host H_1 finds that the requirements for action A[3] are already satisfied and, by step 2.b.i calls this branch ended and assigns to it the probability of success P[1,3]=p[1,3] and the numerical effect T[1,3]=t[1,3].

Figure 16:
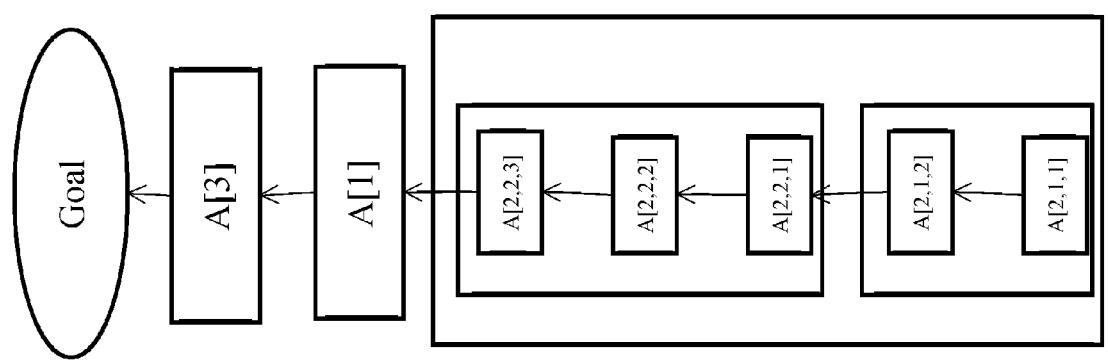
FIG. 16 is a schematic diagram illustrating that the host H_1 finds that the requirements for action A[3] are already satisfied and, by step 2.b.i calls this branch ended and assigns to it the probability of success P[1,3]=p[1,3] and the numerical effect T[1,3]=t[1,3].

Next, the host H_1 compares the quotients T[1,1]/P[1,1] and T[1,3]/P[1,3] and decides to reorder the actions as depicted in FIG. 16. This path describes the probabilistic attack path. Its estimated probability of success is P=P[1,3]+(1−P[1,3])*P[1,1] and expected numerical effect is T=T[1,3]+(1−P[1,3])*T[1,1].

Figure 17:
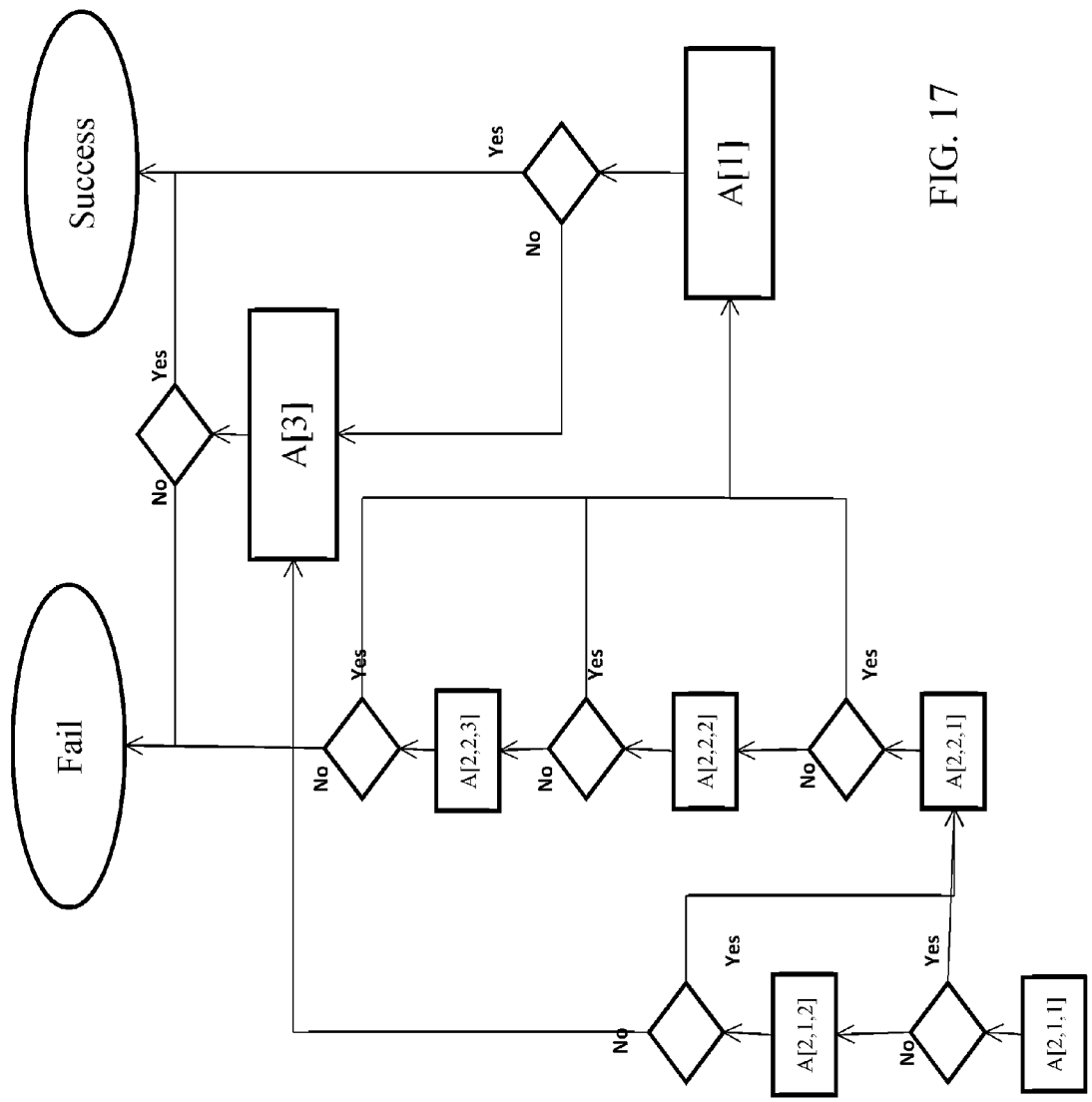
FIG. 17 is a schematic diagram illustrating attack paths.

After this, Host H_1 adds nodes A[2,1,1], A[2,1,2], A[2,2,1], A[2,2,2] and A[2,2,3] and draws the branches as depicted in the directed-acyclic graph of FIG. 17. A result of the first grand step may be represented by the directed-acyclic graph having branches that the abovementioned procedure outputs, as depicted by FIG. 17. The probabilistic plan is interpreted as follows:

First run action A[2,1,1], if this succeeds follow the yes branch and execute action A[2,2,1], but if it fails execute action A[2,1,2];

If action A[2,1,2] succeeds, execute action A[2,2,1], if it fails execute action A[3];

If action A[2,2,1] succeeds, execute action A[1], if it fails execute action A[2,2,2];

If action A[2,2,2] succeeds, execute action A[1], if it fails execute action A[2,2,3];

If action A[2,2,3] succeeds, execute action A[1], if it fails the plan Failed;

If action A[1] succeeds, then the plan succeeds, if it fails execute action A[3]; and If action A[3] succeeds, then the plan succeeds, if it fails the plan Failed.

Second Grand Step

The input for the second grand step includes: the list produced by the preliminary step, the values t and p calculated in the first grand step for each pair in that list, a start node and an end node. The start node is defined as the one host that has an agent installed according to the scenario description. The end node is defined by the host underlying the goal in the scenario description.

Using the list of ordered pairs of hosts computed in the preliminary step, the host H_1 computes a directed graph where the nodes are all of the hosts (or more generally, distinguished assets) that appear in the list, and there is an arc from one node H to a second node H', if and only if, the list contains the pair (H, H'). Moreover, to each arc, the host H_1 assigns two numbers, specifically, the probability of success for an agent that is installed in host H to install an agent in host H' (denoted as p_#), and the numerical effect of this process (denoted as t_#). These numbers were estimated by the first grand step.

Figure 18:
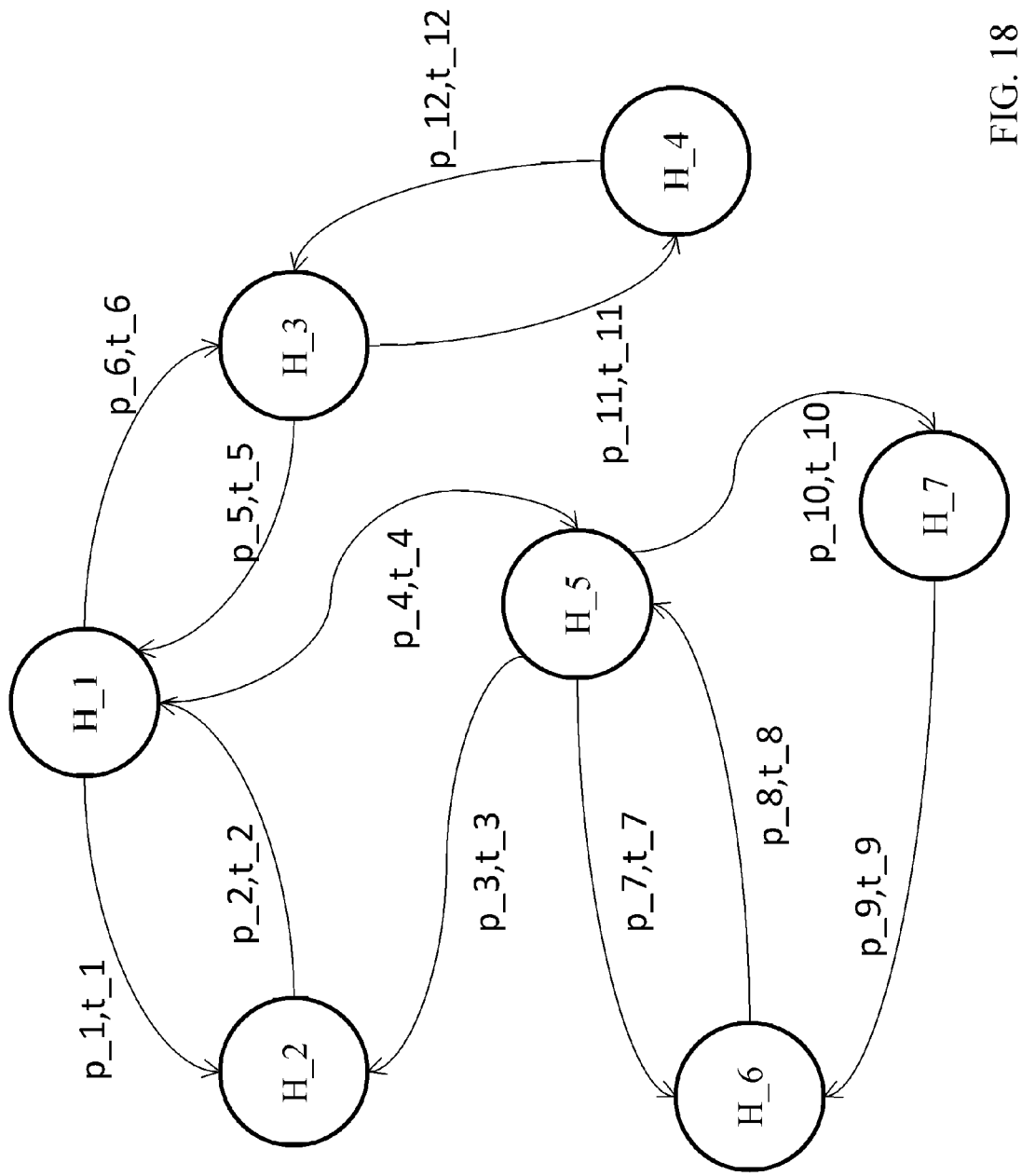
FIG. 18 is a schematic diagram illustrating a directed graph having the present seven hosts interconnected.

FIG. 18 is a schematic diagram illustrating a directed graph having the present seven hosts interconnected. The arrows depict the attackability properties discovered in the preliminary step. Different exemplary probabilities of success and numerical effects are provided in FIG. 18 for exemplary purposes. It should be noted that in certain cases, as an example, in the case of hosts H_5 and H_6, there is an arc from H_5 to H_6 and vice versa.

The second grand step includes finding a path in this graph that starts from the start node, ends by the end node and minimizes the numerical effect. Explicitly, for all the paths that go from the start node to the end node, in the second grand step host H_1 produces the one with the smallest underlying numerical effect. The second grand step also outputs the numerical effect.

This can be analyzed as a sub-problem of the "all-pairs shortest path problem" that is known in the graph theory literature. One of the algorithms that solves this problem was described by R. Floyd in 1962; and previous versions were described by B. Roy in 1959 and S. Warshall in 1962. In the present invention, a modified implementation of the solution of Floyd of 1962 is used, as described hereinbelow.

It is assumed that M is the number of nodes in the directed graph built in the first grand step, with expected numerical effects and probabilities of success in each edge (arrow). We call probability(i,j) to the function that returns the compound probability of successfully attacking node j from node i, or 0 if there is no arc from node i to node j; another function time(i,j) which returns the expected time of successfully attacking node j from node i, or infinity if the graph contains no such arc.

Three matrices are defined, one is denoted by Prob[i][j] of size M times M which at the entry i,j has the value probability (i,j); a second one is denoted by Time[i][j] of size M times M which at the entry i,j has the value time(i,j); and a third one is denoted by Next[0] of size M times M which has the value infinity in every entry. Next the following steps are executed.

for k:=1 to M:
for i:=1 to M:
for j:=1 to M:
  P':=Prob[i][k]*Prob [k][j]
  T':=Time[i][k]+Prob[i][k]*Time[k][j]
  P:=Prob[i][j]
  T:=Time[i][j]
  if P'/T'<P/T then:
    Prob[i][j]:=P'
    Time[i][j]:=T'
    Next[i][j]:=k When this procedure is complete, for each i,j the matrices contain the compound probability Prob[i][j] and the expected run time Time[i][j], of successfully attacking node j from node i. This holds in particular when j is the goal of the attack. The attack path is reconstructed using the values in the matrices.

If the start node was labeled as node a and the end node was labeled as b, then the output numerical effect is Time[a][b]. Also, the procedure uses the canonical technique to reconstruct the path. This step is known in the art and not reproduced herein.

Running the Probabilistic Attack Planner

The present invention is designed to be used to automatically execute penetration tests using, for example, the penetration testing framework described in U.S. Pat. No. 7,757,293 (Caceres et al.) and according to the planning platform described in US non-preliminary application ("System and Method for extending automated penetration testing to develop an intelligent and cost efficient security strategy" by Sarraute Yamada et. al).

In an exemplary run, the planning platform will command the penetration-testing framework to compute the scenario; call the probabilistic attack planning system of this invention to compute a probabilistic attack plan; and finally interact with the penetration testing framework to execute the plan.

First, an information gathering process is performed in order to collect information about the network into the Penetration Testing Framework. An example on how this process can be achieved is by performing a Rapid Penetration Test Information Gathering process as described in U.S. patent application Ser. No. 12/102,482, entitled, "System and Method for providing network penetration testing", filed Apr. 14, 2008, which is incorporated herein by reference. This information is then represented in a PDDL file, which is part of the scenario description.

According to the present example the goal of the planner "Install a system agent in host H_2 starting the attack from a local agent installed in host H_1" is defined, and the numerical effect to be optimized is defined as time. This information is also part of the scenario description.

The Preliminary Step is then executed, whose output is a list of pairs with the "attackability property," The output of this process is shown in Table 1.

TABLE 1

| | |
|---|---|
| H_1 | H_3 |
| H_1 | H_5 |
| H_1 | H_2 |
| H_2 | H_1 |
| H_3 | H_1 |
| H_3 | H_4 |

TABLE 1-continued

| | |
|---|---|
| H_4 | H_3 |
| H_5 | H_2 |
| H_5 | H_6 |
| H_5 | H_7 |
| H_6 | H_5 |
| H_7 | H_6 |

FIG. 4 depicts this information as a directed acyclic graph: each node represents a host (and it is labeled by a host identifier) and arcs represent network connectivity between the hosts.

Host H_1 proceeds with the First Grand Step for each pair in Table 1. As an illustrative example the present description only describes the details of the execution for the pair (H_1, H_2). Following the example, it is assumed that some information about host H_2 is included in the scenario description, wherein the operating system of H_2 is Windows XP with an unknown Service Pack.

Figure 19:
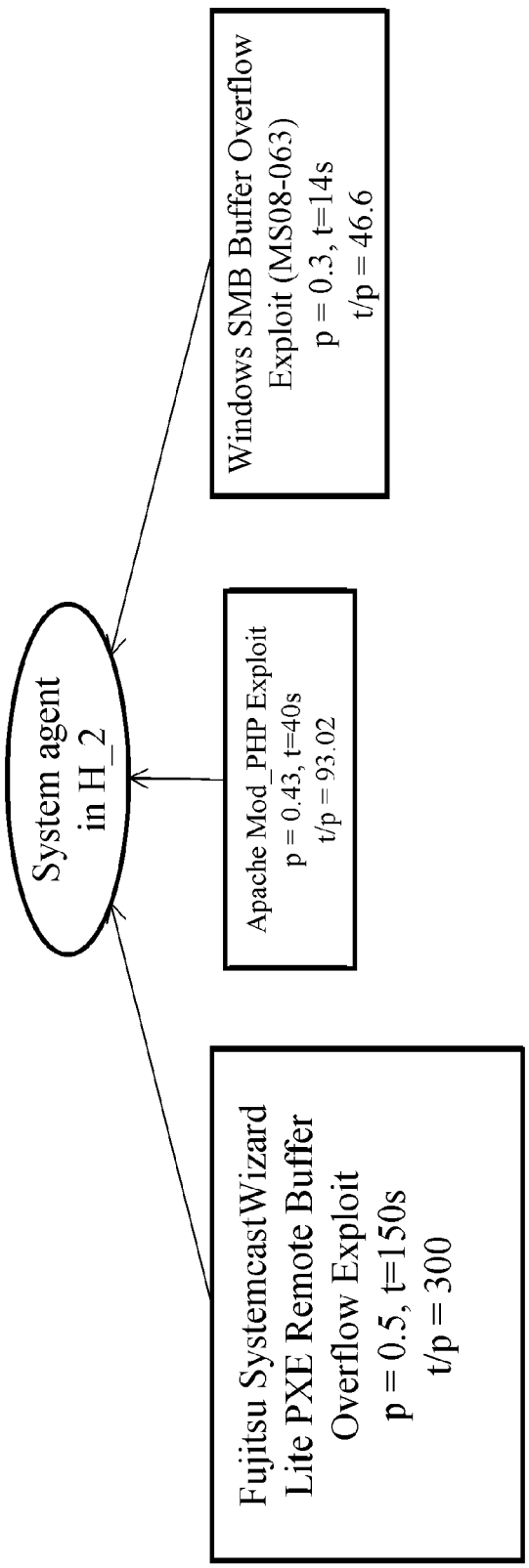
FIG. 19 is a schematic diagram illustrating actions available that have as a result the installation of a system agent in host H_2.

The First Grand Step selects all the actions available that have as a result the installation of a system agent in host H_2. These actions are shown in FIG. 19, as described hereinbelow. Each action has associated with it, in the scenario description, an expected running time and probability of success. The available actions are: "Apache Mod_PHP Exploit" with probability of success 0.43 and expected running time 40 s, "Fujitsu SystemcastWizard Lite PXE Remote Buffer Overflow Exploit" with probability of success 0.5 and expected running time 150 s and "Windows SMB Buffer Overflow Exploit (M508-063)" with probability of success 0.3 and expected running time 14 s. FIG. 19 shows how the actions are ordered from left to right according to their coefficient "expected running time/probability of success".

Figure 20:
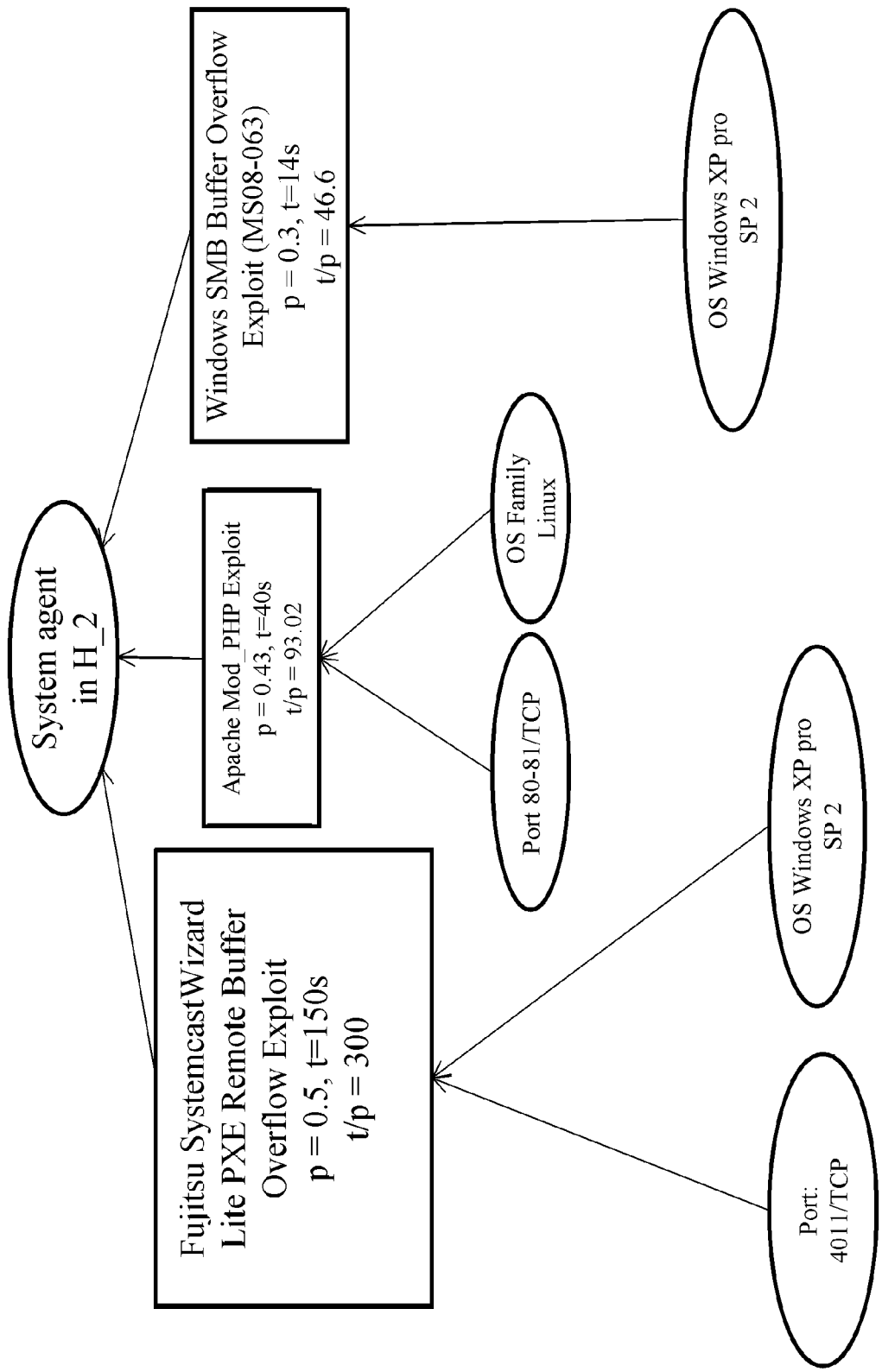
FIG. 20 is a schematic diagram illustrating that once actions have been ordered according to their coefficient, the exemplary process inspects the requirements that still are not satisfied for each of the actions.

Once the actions have been ordered according to their coefficient, the process inspects the requirements that still are not satisfied (e.g., because there is not enough information in the PDDL description of the network) for each of the actions. This is depicted in FIG. 20. For example, action "Fujitsu SystemcastWizard Lite PXE Remote Buffer Overflow Exploit" requires port 4011/TCP open and the OS version Windows XP professional service pack 2. In addition, for the exploit "Apache Mod_PHP Exploit" one of the requirements is that host H_2 must be running a Linux operating system, in addition to Port 80-81/TCP being open. Further, for the exploit "Windows SMB Buffer Overflow Exploit (MS08-063)" the OS needs to be Windows XP professional service pack 2 in the target host.

Figure 21:
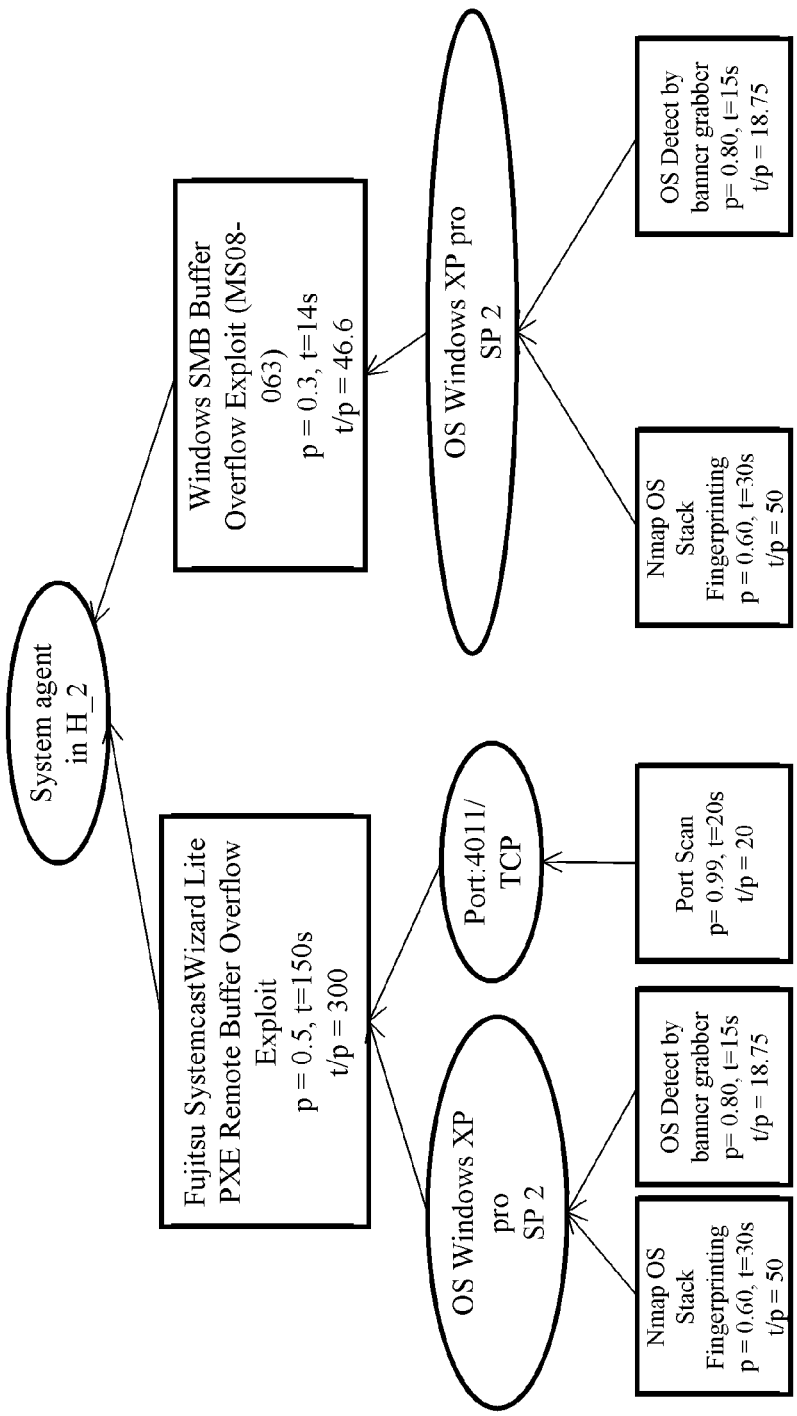
FIG. 21 is a schematic diagram illustrating that Host H_1 checks if the requirements for the actions are satisfied and in the case that they are not, the Host H_1 searches the actions that as an output can ensure whether each requirement is satisfied by the target host.

Host H_1 checks if the requirements for the actions are satisfied. In case they are not, the Host H_1 searches the actions that as an output can ensure whether each requirement is satisfied by the target host. This information is illustrated in FIG. 21. For example, since according to the scenario, the operating system family running in H_2 is Microsoft Windows, the host H_1 removes the action "Apache Mod_PHP Exploit" since there is one requirement which cannot be satisfied.

Figure 22:
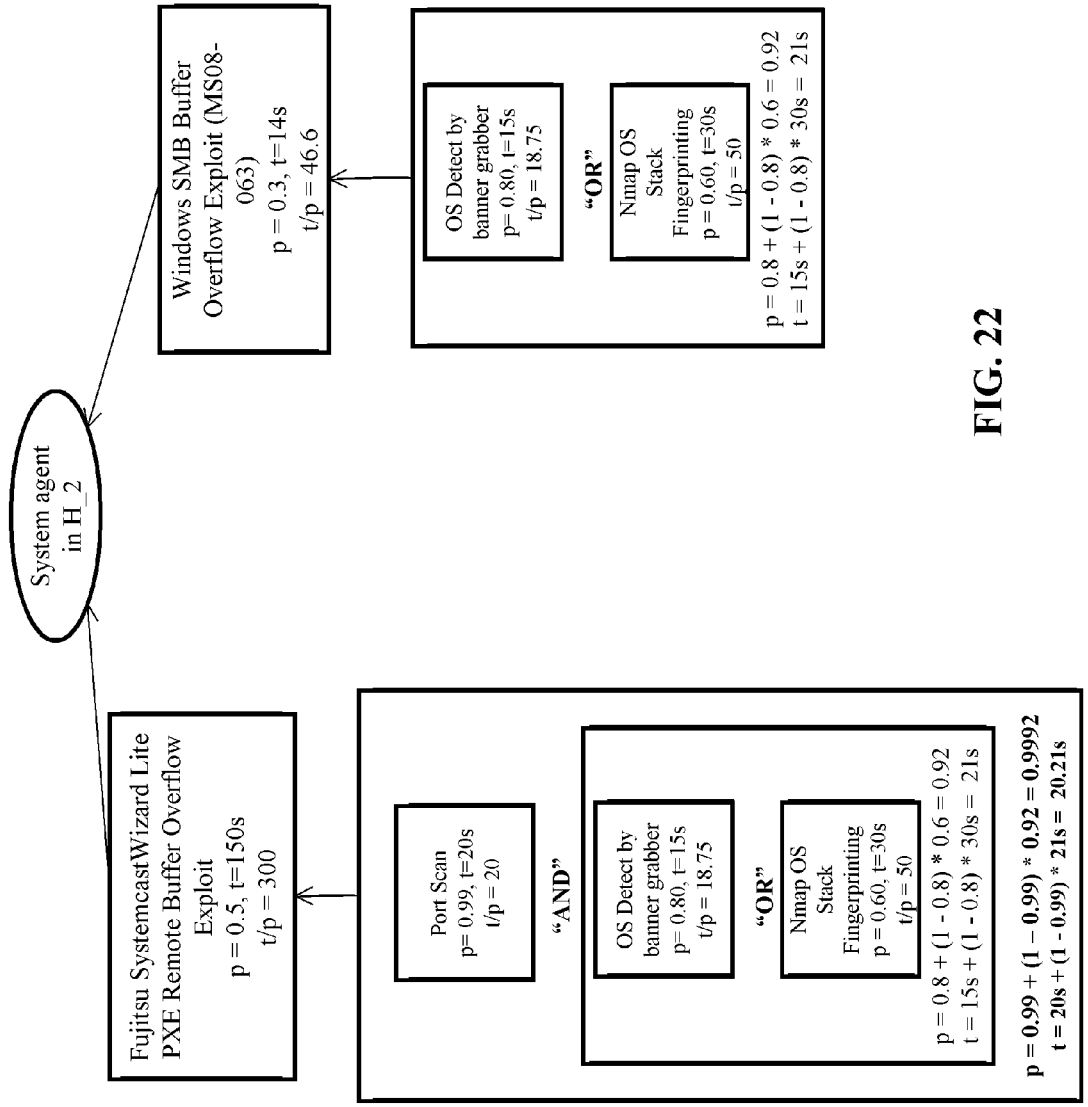
FIG. 22 is a schematic diagram further illustrating how actions are combined, ordering the execution and calculating the compound probabilities and expected run time.

After ordering the second level of actions, an ordered sequence of actions is built for each set of requirements, according to step 2) of the First Grand Step. FIG. 22 further illustrates how actions are combined, ordering the execution and calculating the compound probabilities and expected run time. Whenever two actions are alternatives for the same outcome, they are bounded by an "OR" relation. Alternatively, when two actions must be executed necessarily for the outcome to be achieved, they are bounded by an "AND" relation.

Figure 23:
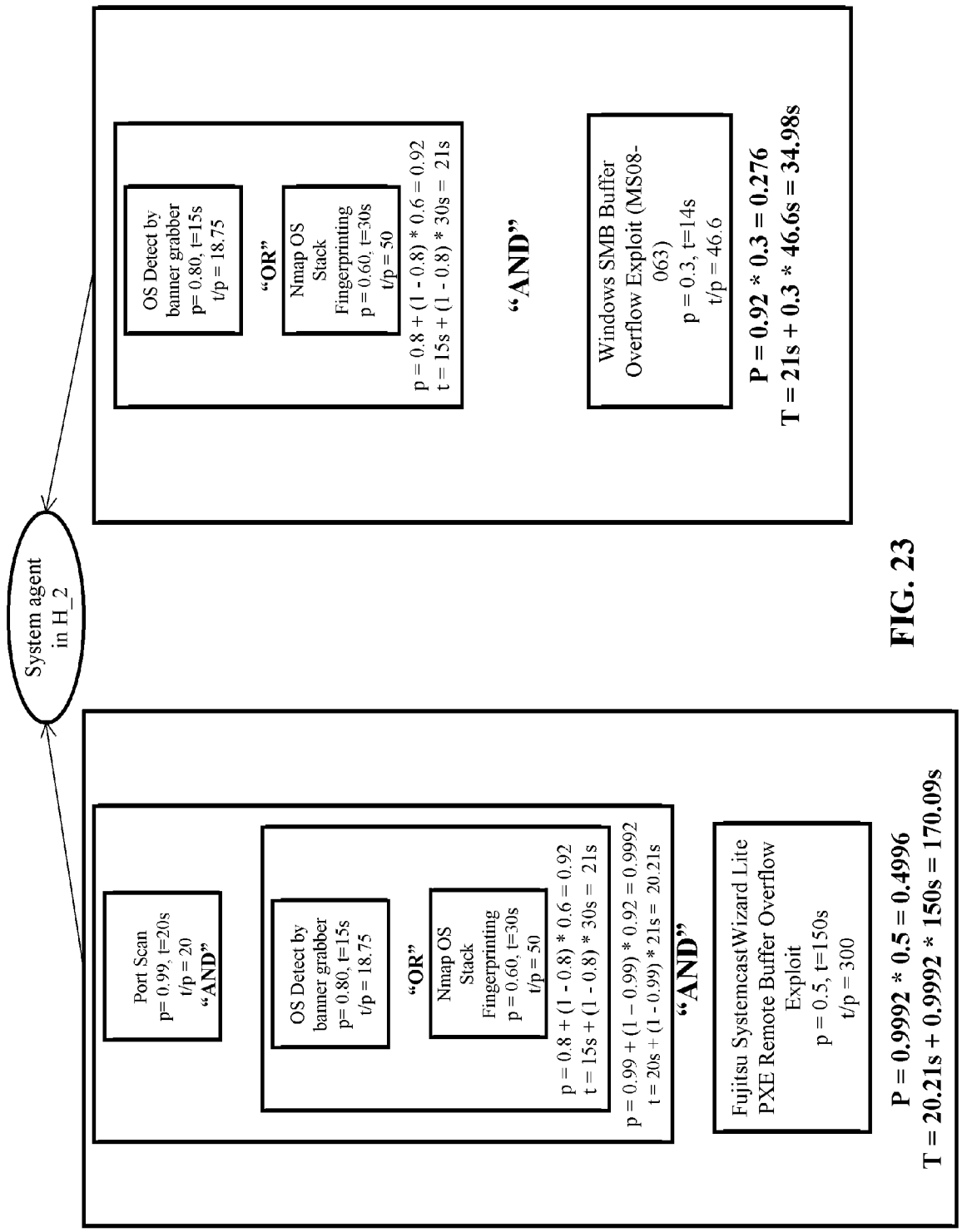
FIG. 23 is a schematic diagram illustrating that once the sequence of actions that complete the requirements for each action is built, the joint probability and expected run time is calculated, now including the first-level actions (here exploits).

Once the sequence of actions that complete the requirements for each action is built, the joint probability and expected run time is calculated, now including the first-level actions (here exploits). FIG. 23 further illustrates this computation.

Figure 24:
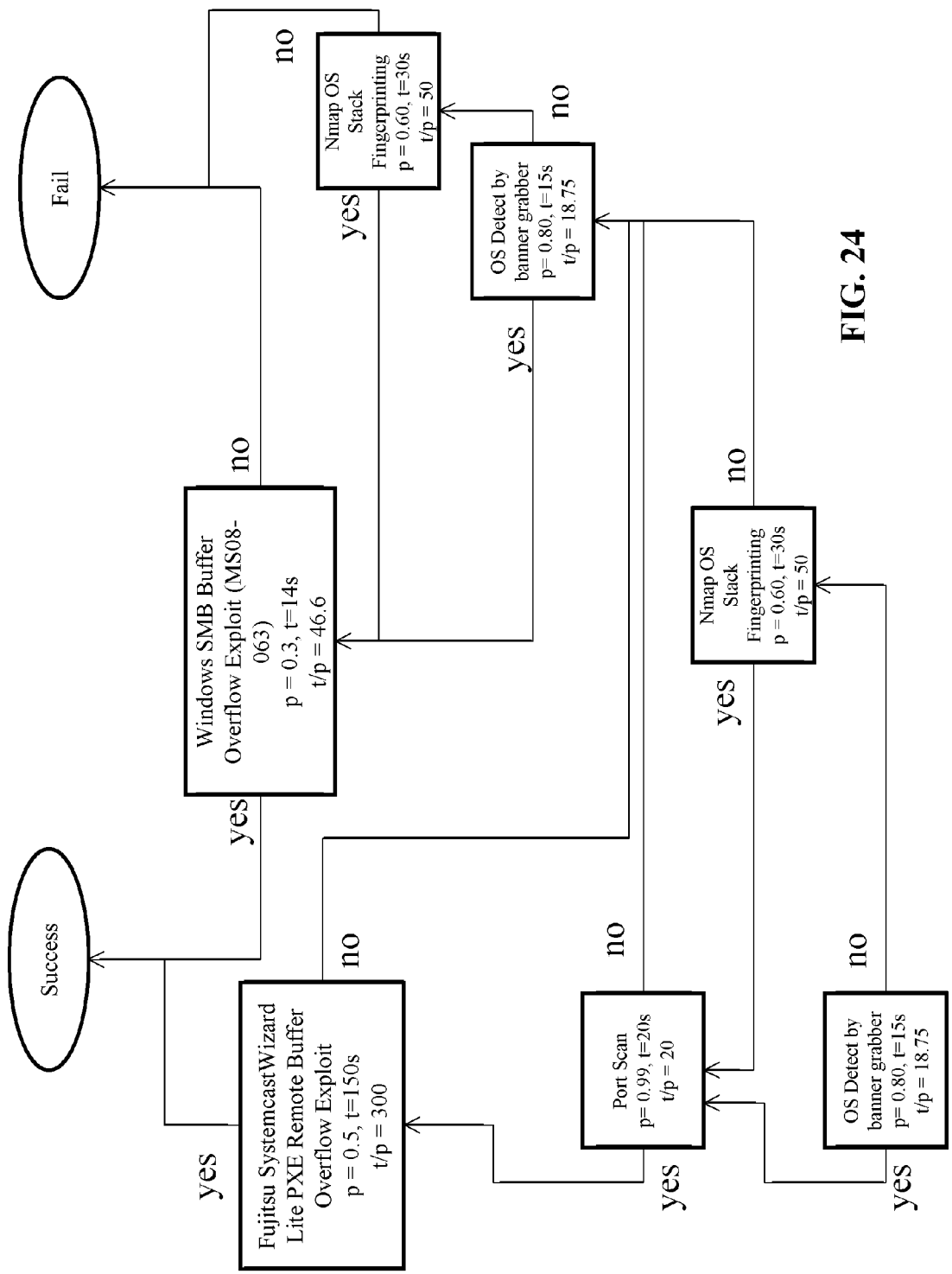
FIG. 24 is a schematic diagram further illustrating the procedure associated with FIG. 23.

For this particular objective, which is "System agent in H_2", all the actions that produce it are combined, together with their respective requirements, calculated in previous steps, in order to obtain a final value P=0.637 and T=158.12, probability of success and expected running time, respectively, of installing a system agent in H_2 attacking from H_1, only with the available actions and with no intermediate hops (i.e., no pivoting). FIG. 24 illustrates the procedure associated with FIG. 23. This means that running the procedure described in FIG. 24 will take less than T=158.12 seconds and will succeed with probability P=0.637.

Next, the planner has calculated the information illustrated in Table 2. The columns added to Table 1 are: the probability of success "PROB" and expected time "TIME" of an attack from host in column "SRC" to host in column "DST" with any suitable action available in the Penetration Testing Framework. Underlined are the values calculated in the above example. These values finish completing the knowledge of the network needed for a complete attack planning.

TABLE 2

| SRC | DST | PROB | TIME |
|---|---|---|---|
| H_1 | H_3 | 0.310 | 60.64 |
| H_1 | H_5 | 0.735 | 90.40 |
| H_1 | H_2 | 0.637 | 158.12 |
| H_2 | H_1 | 0.35 | 125.36 |
| H_3 | H_1 | 0.28 | 45.22 |
| H_3 | H_4 | 0.415 | 300.2 |
| H_4 | H_3 | 0.316 | 64.78 |
| H_5 | H_2 | 0.822 | 35.32 |
| H_5 | H_6 | 0.512 | 223.65 |
| H_5 | H_7 | 0.123 | 155.22 |
| H_6 | H_5 | 0.05 | 78.99 |
| H_7 | H_6 | 0.22 | 147.36 |

Figure 25:
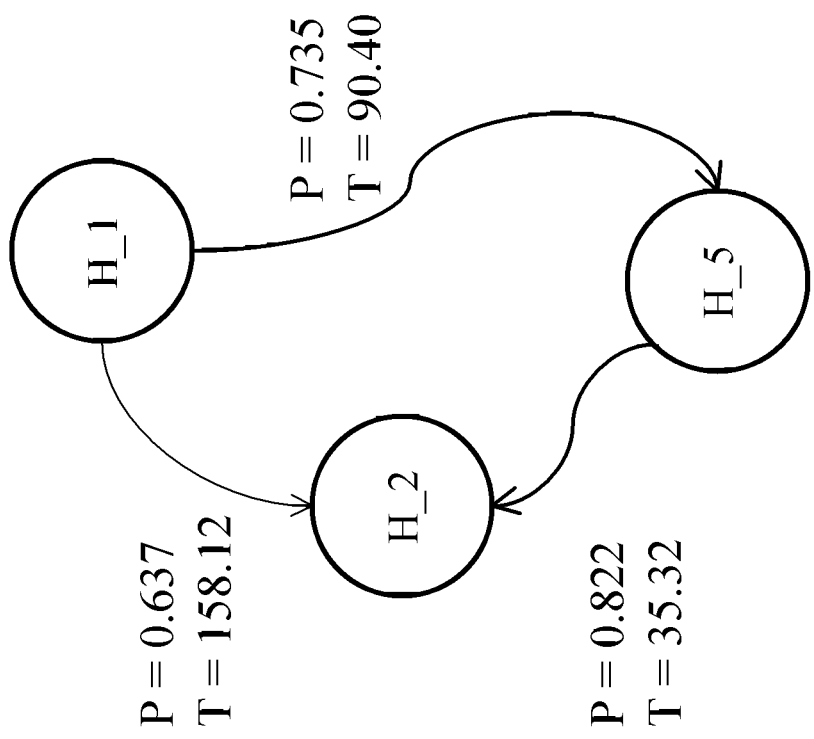
FIG. 25 is a schematic diagram illustrating, in accordance with the example, two of the possible paths that start from H_1 and successfully attack H_2.

Once the First Grand Step is complete, the Second Grand Step begins. After running the modified version of the Floyd-Warshall algorithm, two of the possible paths that start from H_1 and successfully attack H_2 are illustrated in FIG. 25, which shows only a part of the complete graph.

The coefficient t/p for the attack path that goes directly from H_1 to H_2 is 248.22. The attack path that goes from H_1 to H_5 and then from H_5 to H_2 has coefficient 192.59. Thus, in terms of optimizing the expected running time and the probability of success, the best way to attack H_2 starting from H_1 is by first attacking H_5 and then attacking H_2.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A computer-based method for designing a penetration test for a penetration testing framework, comprising the steps of:
   defining a variable to be optimized;
   receiving information through an input/output device of a computer that defines a scenario, wherein the scenario further comprises,
      a definition of a target network,
      a list of penetration testing modules that are available, wherein each penetration testing module has an associated probability of success, requirements, and an expected value for the variable to be optimized, and
      a goal of the penetration test;
   producing, with a computer-based processor, a probabilistic plan, an estimated probability of success for the probabilistic plan, and an expected value for the variable, based on the received information;
   determining, with the computer-based processor, an attack plan for the penetration test based on the probabilistic plan, the probability of success for the probabilistic plan and the expected value for the variable,
   wherein the probabilistic plan, the estimated probability of success, and the expected value for the variable are produced without reference to a particular event that already has occurred in the target network.

2. The computer-based method of claim 1, wherein the probabilistic plan further comprises a directed acyclic graph having branches, wherein the acyclic graph is defined as:
   having a single starting node, a first type of end node labelled success, a second type of end node labelled fail, and a penetration testing module node for each penetration testing module within the scenario, wherein the penetration testing module nodes are referred to as action nodes; and
   for each action node, either, requirements associated with the action of the action node are satisfied according to the scenario description, or there is a second action node that precedes this action node and is associated with an action that checks if this requirement is satisfied.

3. The computer-based method of claim 1 wherein, the variable to be optimized is time.

4. The computer-based method of claim 1, further comprising the step of executing the probabilistic plan in the penetration testing framework.

5. A computer-based method for designing a probabilistic plan for attacking from a first host a second host, for a penetration testing framework, comprising the steps of:
   defining a variable to be optimized;
   defining a scenario, wherein the scenario further comprises, a description of the first host located within a target network, the second host located within the target network, and how the first host and second host are connected, a list of penetration testing modules that are available, wherein each penetration testing module has associated with a probability of success, requirements, and an expected value for the variable to be optimized;
   producing, with a computer-based processor, a probabilistic plan that has as a goal to install an agent in the second host, an estimated probability of success for the probabilistic plan, and an expected value for the variable;
   determining, with the computer-based processor, a probability of success for the probabilistic plan and an amount of time to execute the probabilistic plan; and
   determining, with the computer-based processor, an attack plan for a penetration test based on the probabilistic plan, the probability of success for the probabilistic plan and the amount of time to execute the probabilistic plan,
   wherein the probabilistic plan, the probability of success, and the amount of time to execute are determined without reference to a particular event that already has occurred in the target network.

6. The computer-based method of claim 5, wherein the variable to be optimized is time, or a number of alerts generated in the target network.

7. The computer-based method of claim 5, further comprising the step of executing the probabilistic plan in the penetration testing framework.

8. A computer-based method for designing a penetration test, the computer-based method comprising:
   receiving information through a computer based input/output device about a scenario, wherein the information comprises information about hosts, including computers and applications, on a target computer network;
   producing, with a computer-based processor, a list of ordered pairs of the hosts, where the hosts in each ordered pair are different and satisfy an attackability property, wherein a particular ordered pair of hosts satisfy an attackability property if, given that a network agent is running in a first host of the particular ordered pair, there exists a set of actions that lead to installing a remote agent in a second host of the particular ordered pair;
   determining, with the computer-based processor, for each particular ordered pair of hosts in the list, a probabilistic plan for attacking from a first of the hosts in the particular ordered pair to a second of the hosts in the particular ordered pair;
   determining, with the computer-based processor, for each particular probabilistic plan a probability of success and an amount of time to execute; and
   determining, with the computer-based processor, an attack plan for the penetration test based on the respective probabilistic plans for attacking, the respective probabilities of success and the respective amounts of time to execute,
   wherein the respective probabilistic plans for attacking, the respective probabilities of success, and the respective amounts of time to execute are determined without reference to a particular event that already has occurred in the target network.

9. The computer-based method of claim 8, wherein the attack plan for the penetration test is determined without reference to a particular event that already has occurred in the target network.

10. A computer-based method for designing a penetration test for a penetration testing framework, comprising the steps of:
   defining a variable to be optimized;
   receiving information through an input/output device of a computer that defines a scenario, wherein the scenario further comprises:
      a definition of a target network,
      a list of penetration testing modules that are available, wherein each penetration testing module has associated with a probability of success, requirements, and an expected value for the variable to be optimized, and
      a goal of the penetration test;
   producing, with a computer-based processor, a probabilistic plan, an estimated probability of success for the probabilistic plan, and an expected value for the variable, based on the received information, wherein the probabilistic plan, the estimated probability of success for the probabilistic plan, and the expected value for the variable are produced without reference to a particular event that already has occurred in the target network, wherein the probabilistic plan further comprises a directed acyclic graph having branches, wherein the acyclic graph is defined as:

having a single starting node, a first type of end node labelled success, a second type of end node labelled fail, and a penetration testing module node for each penetration testing module within the scenario, wherein the penetration testing module nodes are referred to as action nodes; and for each action node, either, requirements associated with the action of the action node are satisfied according to the scenario description, or there is a second action node that precedes this action node and is associated with an action that checks if this requirement is satisfied.

* * * * *